(12) United States Patent
Williams et al.

(10) Patent No.: US 8,257,007 B2
(45) Date of Patent: Sep. 4, 2012

(54) CARGO LOADER

(75) Inventors: Daniel S. Williams, Kent, WA (US);
Troy D. Williams, Kent, WA (US)

(73) Assignee: Container Stuffers, LLC, Auburn, WA (US)

( * ) Notice: Subject to any disclaimer, the term of this patent is extended or adjusted under 35 U.S.C. 154(b) by 1018 days.

(21) Appl. No.: 12/180,284

(22) Filed: Jul. 25, 2008

(65) Prior Publication Data

US 2009/0028677 A1    Jan. 29, 2009

Related U.S. Application Data

(60) Provisional application No. 60/962,362, filed on Jul. 27, 2007.

(51) Int. Cl.
*B65G 65/00* (2006.01)
(52) U.S. Cl. ........ 414/395; 414/345; 414/400; 414/539; 414/541
(58) Field of Classification Search .................... 414/23, 414/345, 395, 400, 539, 541, 749.1, 749.3, 414/749.6; 280/421.1, 425.1
See application file for complete search history.

(56) References Cited

U.S. PATENT DOCUMENTS

| | | | | |
|---|---|---|---|---|
| 2,847,137 A | * | 8/1958 | Stringfellow | 414/498 |
| 3,186,566 A | * | 6/1965 | Spinanger et al. | 414/395 |
| 3,722,477 A | * | 3/1973 | Weldy et al. | 119/846 |
| 3,727,777 A | * | 4/1973 | Hanson | 414/400 |
| 3,780,893 A | | 12/1973 | Lassig | |
| 3,857,501 A | | 12/1974 | Lassig | |
| 3,952,887 A | | 4/1976 | Lutz | |
| 4,181,460 A | | 1/1980 | Lutz | |
| 4,256,434 A | | 3/1981 | Stodt | |
| 4,279,557 A | | 7/1981 | Stodt | |
| RE31,060 E | | 10/1982 | Lutz | |
| 4,439,093 A | | 3/1984 | Victorino | |
| 4,487,120 A | * | 12/1984 | Barstow | 100/40 |
| 4,818,171 A | | 4/1989 | Burkholder | |

(Continued)

FOREIGN PATENT DOCUMENTS

JP    58-012845    1/1983

(Continued)

OTHER PUBLICATIONS

International Patent Application No. PCT/US2008/071233 International Search Report dated Feb. 19, 2009, 6 pages.

(Continued)

*Primary Examiner* — Scott Lowe
(74) *Attorney, Agent, or Firm* — Davis Wright Tremaine LLP; George C. Rondeau, Jr.; Heather M. Colburn

(57) ABSTRACT

A cargo loader operable to load cargo into an opening of an enclosed trailer. The loader has an elongated bed with a front portion and a rear open portion. The opening of the trailer is positioned adjacent to the rear open portion of the bed. A pair of sidewalls flank the rear open portion and define an interior cargo receiving area. A carriage is moveably mounted to the bed and coupled to a drive assembly operable to move the carriage between the front portion and the rear open portion. The carriage is positioned on the front portion to allow cargo to be loaded into the cargo receiving area. The carriage is configured to push a ram longitudinally along the bed to push the cargo inside the cargo receiving area into the opening of the enclosed trailer.

45 Claims, 22 Drawing Sheets

U.S. PATENT DOCUMENTS

| | | |
|---|---|---|
| 4,861,220 A | 8/1989 | Smith |
| 5,054,987 A | 10/1991 | Thornton |
| 5,186,596 A | 2/1993 | Boucher |
| 5,515,664 A | 5/1996 | Tanaka |
| 5,577,873 A | 11/1996 | Tanaka |
| 6,006,893 A * | 12/1999 | Gilmore et al. ............... 198/588 |
| 7,172,382 B2 | 2/2007 | Frankel |
| 7,188,816 B2 | 3/2007 | Aoki |
| 7,588,406 B2 | 9/2009 | Frankel |

FOREIGN PATENT DOCUMENTS

| | | |
|---|---|---|
| JP | 07010293 | 1/1995 |
| JP | 07010293 A | 1/1995 |
| JP | 07257441 A | 10/1995 |
| JP | 7098582 B2 | 10/2005 |
| JP | 2007119238 A | 5/2007 |
| KR | 10-0278946 B1 | 5/2006 |

OTHER PUBLICATIONS

International Patent Application No. PCT/US2011/020123: International Search Report dated Sep. 2, 2011, 6 pages.

* cited by examiner

United States Patent US 8,257,007 B2

CARGO LOADER

CROSS REFERENCE TO RELATED APPLICATION(S)

This application claims the benefit of U.S. Provisional Application No. 60/962,362, filed Jul. 27, 2007.

BACKGROUND OF THE INVENTION

1. Field of the Invention

The present invention is directed generally to cargo loaders, and more particularly to cargo loaders for elongated objects, such as logs, that are transported on cargo container ships, railroad cars, trailers, and the like.

2. Description of the Related Art

In many countries, logs are harvested at a tree farm or in a forest and transported via a logging truck to a logging yard. At the logging yard, the logs are unloaded from the logging truck and stacked into large horizontal piles. Some of the logs are later sold to buyers who transport them via a logging truck to another logging yard or lumber mill.

Some logs are also purchased by buyers who transport the logs from the logging yard via a logging truck or railroad car to a cargo container ship located at a nearby port. The logs are then individually removed from the logging truck or railroad car and loaded onto piles located on the hull of the container ship. When the ship reaches its final destination, the logs are removed from the ship and re-loaded onto logging trucks or railroad cars, which subsequently deliver the logs to a logging yard or lumber mill.

Needless to say, loading and unloading individual logs on and off logging trucks or railroad cars and on and off the cargo container ship is dangerous and labor intensive. Also, when logs are placed in large piles on the ship, the logs can shift during transport causing the ship to lean to one side (or list) and potentially capsize. This problem may be avoided by loading logs into cargo containers that are stacked on the cargo ship but loading logs into an enclosed cargo container open only at its rear end portion is challenging. Presently, logs (and many other types of cargo) are loaded into containers one at a time. The loading process is typically done with the use of log handling equipment ill suited for the job.

The log handling equipment typically used is capable of picking up only one log out of a log storage stack and placing one end of that log into a container. Typically, the log must be re-grasped several times in order to push it fully into the container. Then, the next log is wrestled into the container. Because of the difficulties loading logs using prior art log handling equipment, employee safety is a significant concern. Further, the cargo container and/or other equipment may be damaged in the process.

When the container is finally full, the container truck operator must pull the load to a scaling device to determine whether the loaded container is under or over legal weight limits. If the container is too heavy or too light, logs must be removed from or added to the container. Then, the container must be re-weighed and the process repeated until the container has a satisfactory weight.

Therefore, a need exists for a method and apparatus for loading logs quickly and easily to and from a logging truck or railroad car and to and from a cargo container ship. In particular, a need exists for an apparatus configured to load logs and other cargo into a cargo container transportable on an over-the-road trailer, railroad car, container ship, and the like.

The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
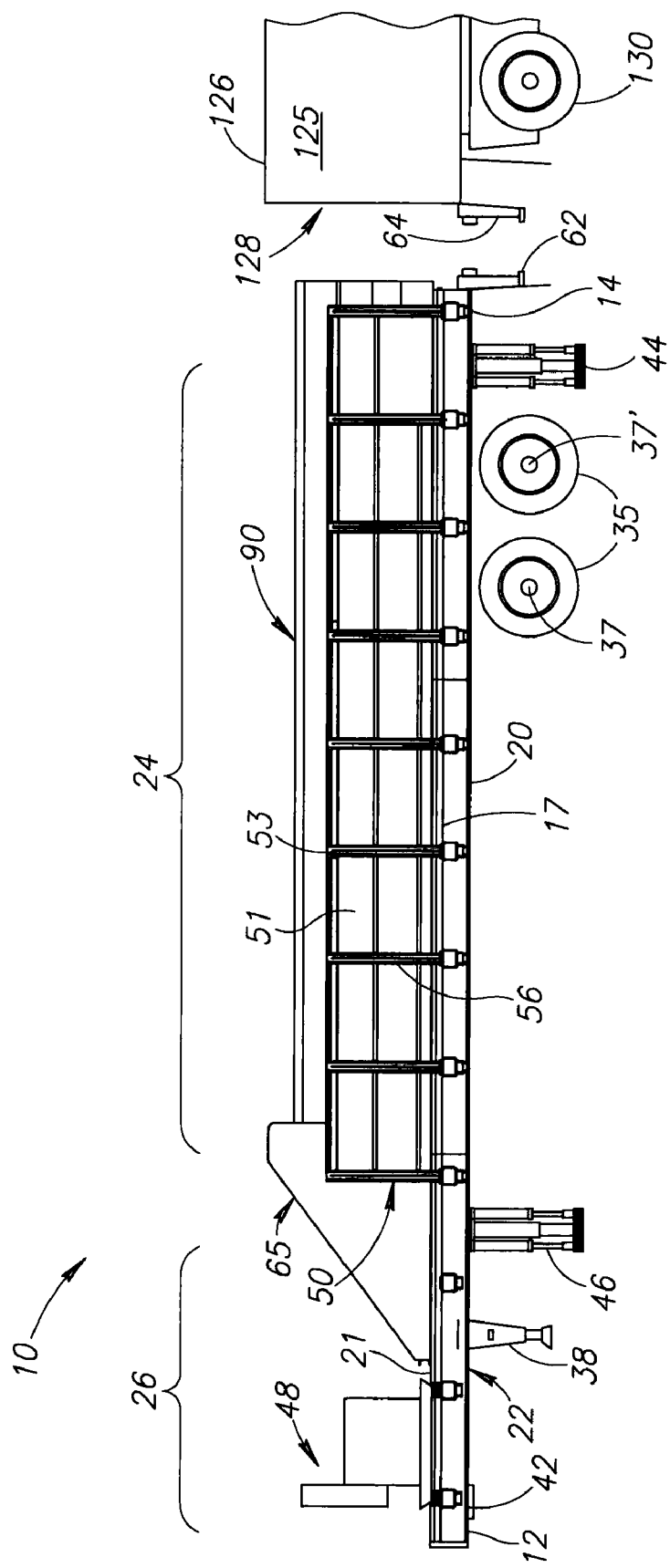
FIG. 1 is a side view of a first embodiment of a cargo loader apparatus loaded with logs.

FIG. 1 depicts a first embodiment of an apparatus 10 for receiving a cargo 90 (e.g., a pile of logs, boxes, and the like) and transporting and/or loading that cargo into a cargo container 125 supported above the ground by a support structure, such as an over-the-road trailer 130. Alternatively, the support structure may include a tug, a railroad car, box trailer, flat bed trailer, and the like.

The cargo container 125 has a rear portion 126 having a rearward facing opening 128 into which the cargo 90 may be loaded. The trailer 130 is configured to be pulled behind a tractor (not shown). Trailers suitable for supporting and transporting cargo containers are well known in the art and will not be described in detail herein.

The cargo 90 may include commodities that have been palletized for shipment into the cargo container 125. The cargo 90 may also include elongated objects and goods (such as logs, poles, pipes, wire bundles, and the like), which may be difficult to load into the cargo container 125 through only the rearward facing opening 128.

In the embodiment depicted in the figures, the apparatus 10 includes a height adjustable flat bed trailer 20 configured to be pulled behind a semi tractor (not shown). In other words, the apparatus 10 is configured to be mobile and moveable from one location to another. However, this is not a requirement and embodiments in which the apparatus is configured to remain in a stationary position are within the scope of the present teachings. The trailer 20 is selectively couplable by a front end portion 12 to the tractor and by a rear end portion 14 to the rear portion 126 of the container 125. The rear end portion 14 of the trailer 20 is coupled to the container 125 when the apparatus 10 is transferring the cargo 90 into the opening 128 of the rear portion 126 of the cargo container 125. A substantially flat bed or deck (not shown) configured to received the cargo 90 from the apparatus 10 is provide inside the cargo container 125.

In embodiments configured for use with a cargo comprising a pile of logs, the logs may be transported by the apparatus 10 from a first location, such as a log yard, another trailer, a railroad car, and the like, to a second location at which the cargo container 125 is located. Because the apparatus 10 is configured to be pulled behind a tractor (not shown), the apparatus 10 may be loaded with logs and coupled to the tractor at the first location. Then, the loaded apparatus 10 may be pulled by the tractor to the second location. At the second location, the logs may be transferred by the apparatus to the cargo container 125. The cargo container 125, with the cargo 90 stowed therein, may be easily transported to another location by the trailer 130, a railroad car, a cargo container ship, and the like.

Figure 2:
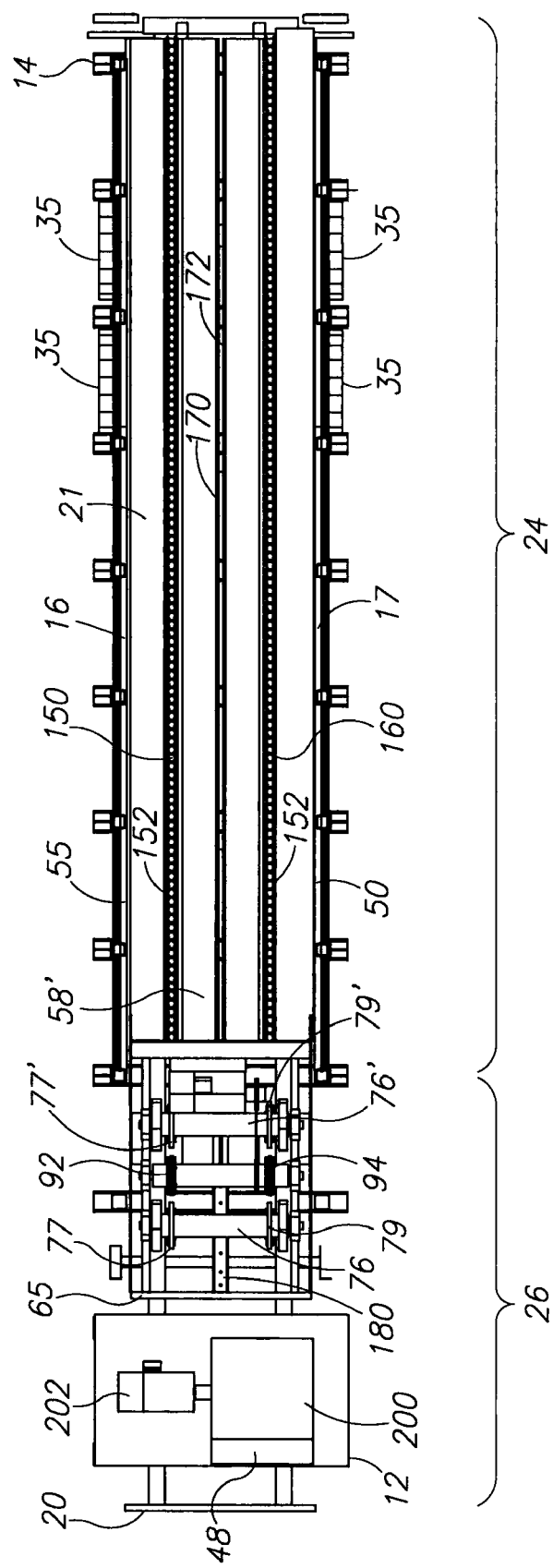
FIG. 2 is a top plan view of the cargo loader apparatus of FIG. 1 with the logs removed.

Referring to FIGS. 1 and 2, the trailer 20 of the apparatus 10 has a generally rectangular-shaped bed 21 supported above the ground by an elongated frame 22. The bed 21 is configured to receive and support the cargo 90. The bed 21 has a first longitudinal side portion 16 located opposite a second longitudinal side portion 17. The bed 21 depicted in the drawings includes a pair of longitudinally extending channels 152 flanking a longitudinally extending center channel 170. The center channel 170 has a bottom portion 171 (see FIG. 6) in which a through-slot 172 (see FIG. 6) extends.

The frame 22 has a rear cargo carrying section 24 at an opposite end portion of the frame from a front section 26. In the embodiment depicted, the rear section 24 is longer than the front section 26. The length of the rear section 24 may be determined at least in part by the length of the cargo 90. For example, in embodiments in which the cargo 90 is a pile of logs, the length of the rear section 24 may be greater than or approximately equal to the length of the logs.

Figure 3:
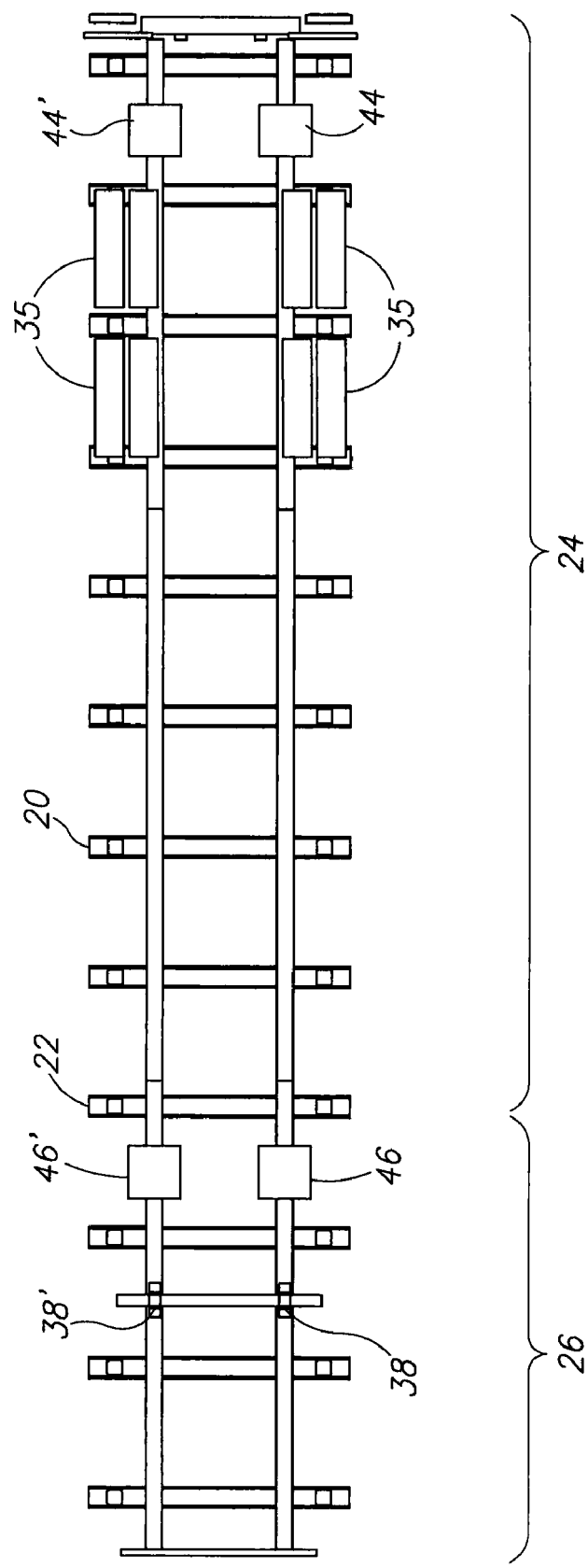
FIG. 3 is a top plan view of a frame of a trailer of the cargo loader apparatus of FIG. 1.

Referring to FIGS. 1 and 3, one or more axles 37 and 37' are rotatably mounted on the underside of the rear section 24. One or more wheels 35 are coupled to each of the axles 37 and 37' adjacent each of the sides 16 and 17 of the bed 21. Two manually adjustable support legs 38 and 38' and a tractor king pin 42 are mounted on the underside of the front section 26. The tractor king pin 42 is designed to be attached to the fifth wheel coupling on the semi tractor or a tug (not shown).

A first pair of adjustable hydraulic legs 44 and 44' are attached to the underside of the rear section 24. A second pair of adjustable hydraulic legs 46 and 46' is attached to the underside of the front section 26. When the trailer 20 is pulled behind the tractor, the tractor king pin 42 is attached to the fifth wheel coupling on the tractor and the rear wheels 35 are disposed on the ground. To decouple the trailer 20 from the tractor, the hydraulic legs 44, 44', 46, and 46' are lowered to the ground. Then, the tractor king pin 42 detached from the fifth wheel coupling and the tractor driven forward and away from the trailer 20. Thus, the trailer 20 is supported on the ground by the hydraulic legs 44, 44', 46, and 46' and the rear wheels 35.

As illustrated in FIG. 1, the length of the hydraulic legs 44, 44', 46, and 46' may be increased to raise the height of the bed 21 of the trailer 20 relative to the ground. In the configuration depicted in FIG. 1, the hydraulic legs 44, 44', 46, and 46' support the entire weight of the apparatus 10 and its cargo 90. The length of the first and second pairs of adjustable hydraulic legs 44, 44', 46, and 46' may be decreased or increased to lower or raise the bed 21 of the trailer 20 to a desired height. Specifically, the length of the hydraulic legs 44, 44', 46, and 46' may be adjusted to position the bed 21 at a height suitable for sliding the cargo 90 from the bed 21 through the opening 128 and onto the deck of the cargo container 125 located adjacent to the rear end portion 14 of the trailer 20. The length of the hydraulic legs 44, 44', 46, and 46' may be adjusted to substantially level the bed 21 of the trailer 20 and preferably make the bed 21 substantially co-planar with the deck of the cargo container. Then, the support legs 38 and 38' may be manually adjusted to reach the ground to provide additional support.

Returning to FIG. 2, mounted adjacent to the opposite sides 16 and 17 of the bed 21 are two upright and confronting sidewalls 50 and 55 that each extends longitudinally along one of the opposite sides of the bed 21. Defined between the two sidewalls 50 and 55 is an elongated passageway 58. As may best be viewed in FIG. 1, in particular embodiments, the two sidewalls 50 and 55 are constructed from a plurality of side panels 51 connected to two height adjustable hydraulic vertical supports 53 and 56. During operation, the hydraulic supports 53 and 56 may be lowered or raised to accommodate different cargo heights. For example, the hydraulic vertical supports 53 and 56 may be lowered or raised to accommodate loading different height piles of logs on the trailer 20.

Also, mounted at the rear end 14 of the trailer 20 is a container trailer holding mechanism, such as a trailer hitch 62. A coupler 64 is attached to the trailer 130, or other support structure supporting the cargo container 125. The coupler 64 is used to hold the trailer 130 in a longitudinally aligned position with the passageway 58 of the apparatus 10, while cargo 90 is slid, pushed, or otherwise forced from the trailer 20 into the opening 128 and onto the deck of the cargo container 125, and to avoid the trailer 20 and trailer 130 separating during the process as a result of the force applied.

Returning to FIG. 2, first and second chains 150 and 160 are longitudinally aligned with the bed 21 and extend along its length. Each of the chains 150 and 160 is anchored at its opposite ends to opposite ends of the bed 21. Thus, one end of each of the chains 150 and 160 is affixed to the bed 21 toward the front end portion 12 of the trailer 20 and the other end of each of the chains 150 and 160 is affixed to the bed 21 toward the rear end portion 14 of the trailer 20. In the embodiment depicted, each of the chain 150 and 160 resides in a channel 152 formed in the bed 21 that helps maintain the lateral position of the chain relative to the bed.

Movable Carriage

Figure 5:
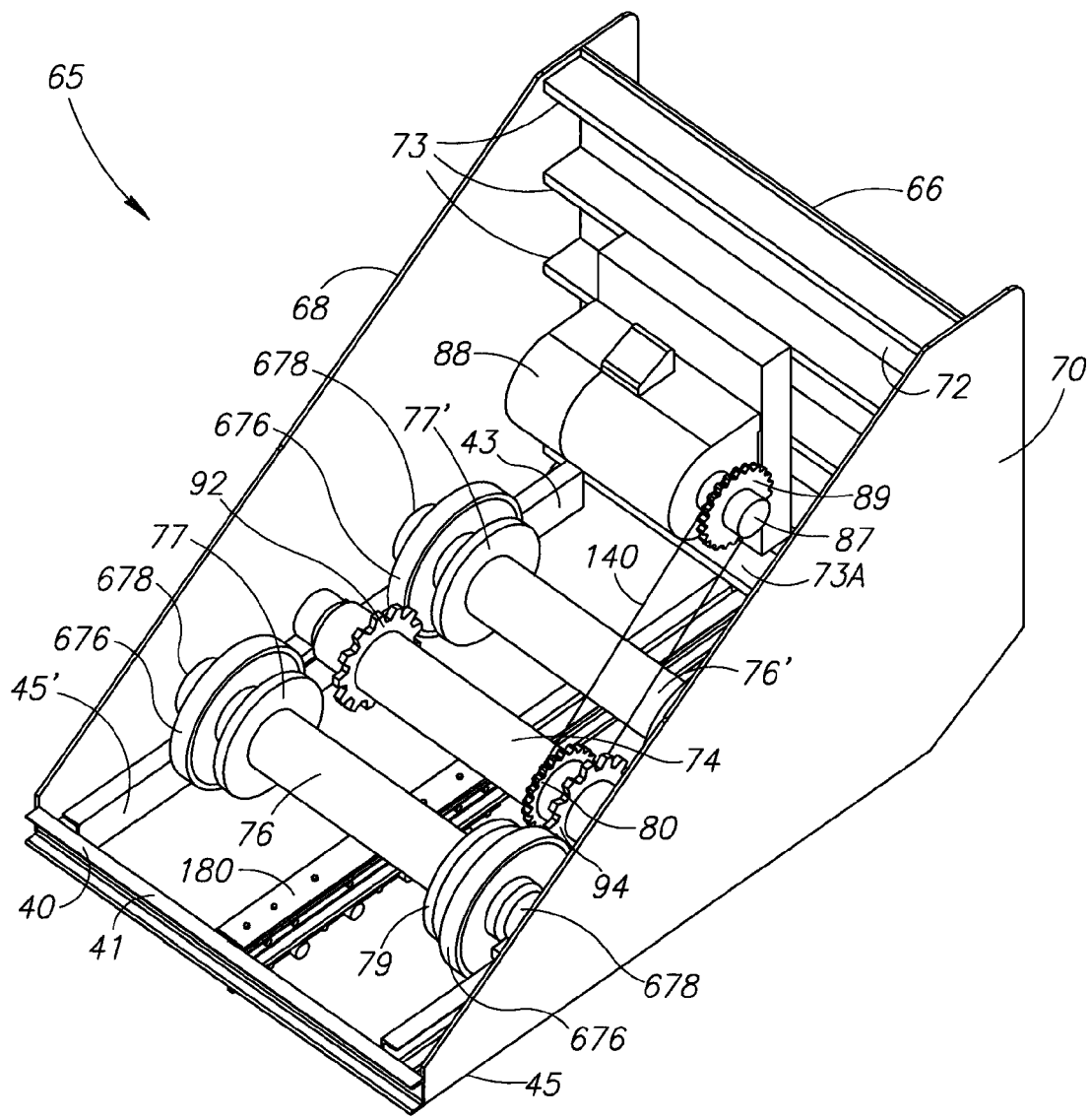
FIG. 5 is a perspective view of a carriage of the cargo loader apparatus of FIG. 1.

Turning to FIGS. 2 and 5, the apparatus 10 includes a movable sled or carriage 65 mounted on the bed 21 of the trailer 20 and coupled to the chains 150 and 160. The carriage 65 is designed to move fore and aft longitudinally over the bed 21 inside the passageway 58 between the two sidewalls 50 and 55. The path of travel of the carriage 65 is determined by the chains 150 and 160. Thus, the length of the path of travel may be increased or decreased by changing the lengths of the chains 150 and 160 and/or the locations along the bed 21 at which the ends of the chains 150 and 160 are affixed.

The carriage 65 includes a base portion 40 disposed on the bed 21. The base portion 40 has a front portion 41, a rear portion 43, and two opposing side portions 45 and 45' substantially aligned longitudinally with the sides 16 and 17, respectively, of the bed 21. The carriage 65 also includes a pair of spaced apart sidewalls 68 and 70, each mounted to one of the portions 45 and 45' of the base portion, and a rearwardly facing planar ram surface 66 extending between the sidewalls 68 and 70. The planar ram surface 66 is substantially perpendicular to the base portion 40 and attached to the rear portion 43 of the base portion 40. The ram surface 66 is adjacent to a front end portion (not shown) of the cargo 90 (see FIG. 1) and configured to press against the front end portion of the cargo 90. The carriage 65 includes a rear wall 72 opposite the front ram surface 66. One or more supports 73 may be mounted to the rear wall 72 and extend between the sidewalls 68 and 70. The rear wall 72 may be coupled to the rear portion 43 of the base portion 40 by a lower support 73A.

A drive axle 74 is mounted transversely on the base portion 40 of the carriage 65. The drive axle 74 is flanked by a front guide axle 76 and a rear guide axle 76' both of which are mounted transversely on the base portion 40 of the carriage 65. A main sprocket 80 flanked by two secondary gears 92 and 94 are mounted on the drive axle 74. The secondary gears 92 and 94 are configured to engage the two chains 150 and 160, respectively.

A motor 88 is mounted on the rear wall 72. The motor 88 may include any suitable motor known in the art including an electric motor, hydraulic motor, and the like. The motor 88 is configured to rotate a drive shaft 87 having a sprocket 89 attached thereto. The main sprocket 80 mounted on the drive axle 74 is engaged by a chain 140 connected to the sprocket 89 attached to a drive shaft 87 of the motor 88.

The front guide axle 76 includes two guide sprockets 77 and 79 aligned over the two chains 150 and 160, respectively. The rear guide axle 76' includes two guide sprockets 77' and 79' aligned over the two chains 150 and 160, respectively. During assembly of the apparatus 10, the carriage 65 is coupled to the chains 150 and 160. Specifically, the chain 150 is looped over the sprockets 77 and 77' and the chain 160 is looped over the sprockets 79 and 79' to hold the carriage 65 on the bed 21. Thus, after assembly, the chain 150 loops over the sprocket 77, under the secondary gear 92, and over the sprocket 77', and the chain 160 loops over the sprocket 79, under the secondary gear 94, and over the sprocket 79'.

Each of the front guide axle 76 and the rear guide axle 76' have a wheel 676 (described below) mounted toward each end. Specifically, a first wheel 676 is mounted to the front guide axle 76 between the guide sprockets 77 and the sidewall 68 and a second wheel 676 is mounted to the front guide axle 76 between the guide sprockets 79 and the sidewall 70. A first wheel 676 is mounted to the rear guide axle 76' between the guide sprockets 77' and the sidewall 68 and a second wheel 676 is mounted to the rear guide axle 76' between the guide sprockets 79' and the sidewall 70.

By activating the motor 88 in a first direction, when the two secondary gears 92 and 94 are engaged with the chains 150 and 160, respectively, the carriage 65 is moved in a first direction (e.g., forward toward the front end portion 12 of the trailer 22) over the bed 21. By activating the motor 88 in a second direction opposite the first, when the two secondary gears 92 and 94 are engaged with the chains 150 and 160, respectively, the carriage 65 is moved in a second direction opposite the first (e.g., rearward toward the rear end portion 14 of the trailer 20) over the bed 21. In the embodiment depicted, the carriage 65 rolls along the bed 21 on the wheels 676.

Figure 6:
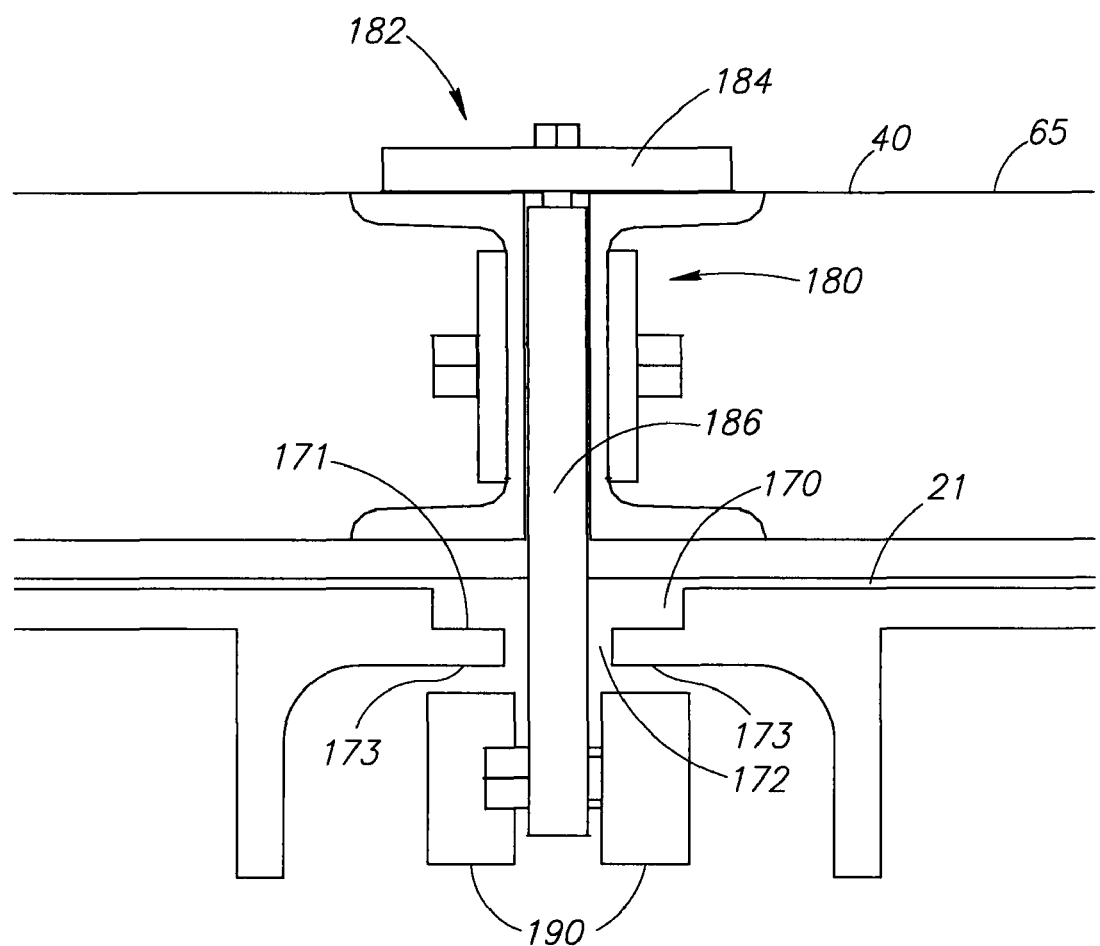
FIG. 6 is an enlarged lateral cross-sectional view of a traveler assembly coupled to the carriage of FIG. 5 and engaged with a center channel formed in the bed of the cargo loader apparatus.

As mentioned above, the bed 21 includes the longitudinally extending center channel 170 located between the pair of channels 152 in which the chains 150 and 160 reside. Referring to FIG. 6, the bottom portion 171 of the channel 170 includes the longitudinally extending through-slot 172. The carriage 65 includes a traveler assembly 180 attached to the base portion 40. The traveler assembly 180 is described in more detail below with respect to an alternate embodiment. The traveler assembly 180 includes a T-shaped assembly 182 with a top horizontal plate 184 coupled to an upright center plate 186. Attached to the lower end of the center plate 186 are several sets of support wheels 190 that extend from opposite faces of the center plate 186. During use, the center plate 186 is disposed inside the slot 172 formed in the longitudinal channel 170 of the bed 21. When the carriage 65 is moving, the wheels 190 press against a portion 173 of the underside of the bed 21 so that the carriage 65 moves freely over the channel 170 and its upward movement from the bed 21 is restricted by the wheels.

Turning to FIGS. 1 and 2, the apparatus 10 includes a control center 48 located on the front section 26 of the frame 22. The control center 48 may include a hydraulic pump 200 and an electric generator 202 mounted at the front section 26 of the frame 22. Alternatively, an external hydraulic pump 200 and/or an external electric generator 202 may be coupled to the control center 48. By way of a non-limiting example, the hydraulic pump 200 may include a compressed air source (such as an air compressor or compressed air tank), Porta Power unit, and the like. The hydraulic pump 200 and the electric generator 202 are connected to and power the trailer's four hydraulic legs 44, 44', 46, and 46', the height adjustable hydraulic vertical supports 53 and 56 for the sidewalls 50 and 55, and the motor 88 on the carriage 65.

Figure 4A:
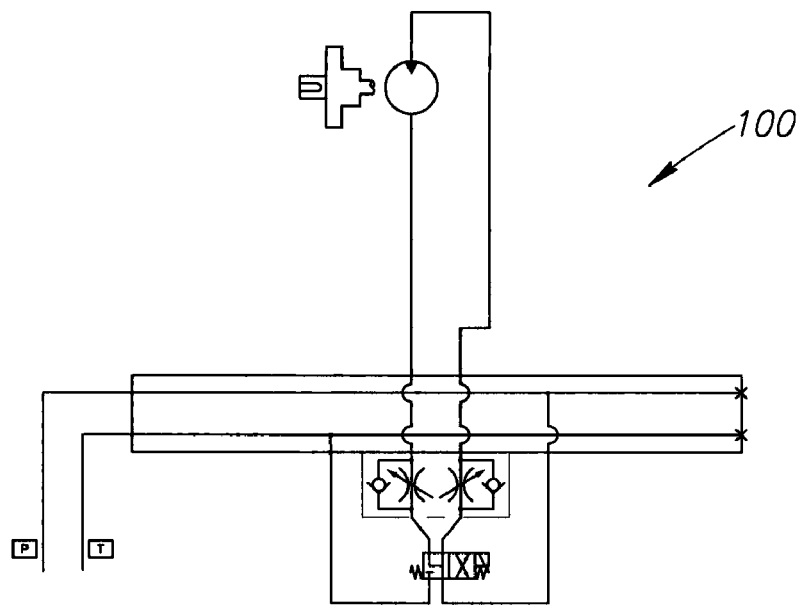
FIG. 4A is a diagram of the hydraulic control system.
Figure 4B:
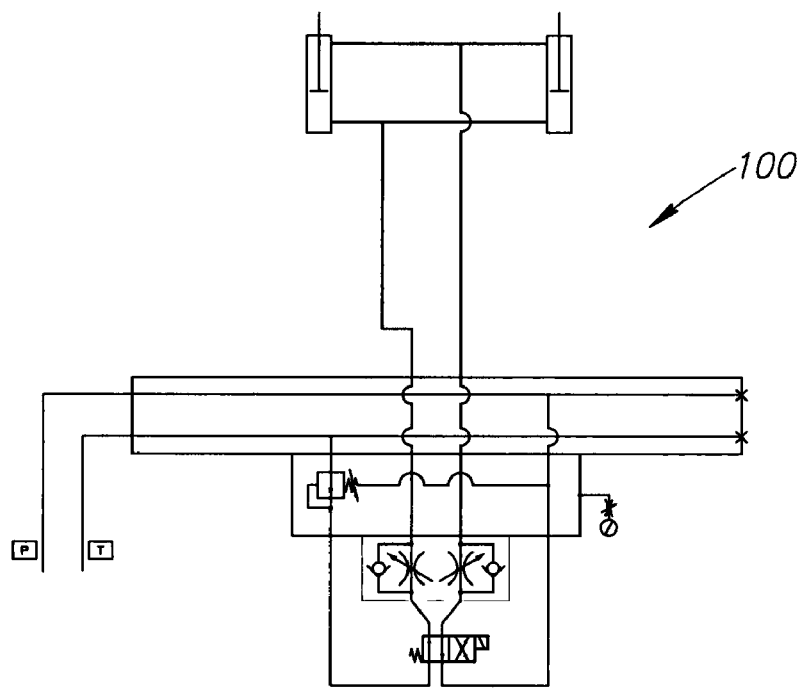
FIG. 4B is a diagram of the hydraulic control system.

Hydraulic lines (not shown) and valves (not shown) connect the first and second pairs of adjustable hydraulic legs 44, 44', 46, and 46' to the control center 48. Similarly, hydraulic lines (not shown) and valves (not shown) connect the hydraulic vertical supports 53 and 56 to the control center 48. FIGS. 4A and 4B provide diagrams of an exemplary hydraulic control system 100 incorporated into the control center 48.

During operation, the apparatus 10 is delivered by a tractor (not shown) to a relatively flat loading site. For example, the apparatus 10 may be positioned on a level concrete, asphalt or compacted base surface. During transport, the carriage 65 may be positioned on the rear section 24 of the frame 22. The four hydraulic legs 44, 44', 46, and 46' on the trailer 20 are next adjusted in height so that the height of the bed 21 is substantially equal to the height of the cargo container 125 supported by the trailer 130 (or similar support structure)

located adjacent to the rear end 14 of the trailer 20. The four hydraulic legs 44, 44', 46, and 46' may also be used to level the bed 21 of the apparatus 10.

The rear end portion 126 of the trailer 130 is then connected or coupled to the trailer 20. If the carriage 65 is located on the rear section 24 of the frame 22, the carriage 65 is moved to the front section 26 of the frame 22 of the trailer 20 and the cargo 90 (e.g., a pile of logs) is loaded into the passageway 58 defined between the two sidewalls 50 and 55 and rearward of the carriage. Because the height of the cargo 90 is limited to the height of the cargo container 125, the height of each of the sidewalls 50 and 55 may be adjusted by the hydraulic vertical supports 53 and 56 for the sidewalls 50 and 55.

The motor 88 of the carriage 65 is then activated to move the carriage 65 rearwardly over the bed 21 to push or otherwise force the logs 90 to slide along the bed 21 in general longitudinal alignment into the opening 128 of the cargo container 125. Once the cargo 90 is transferred to the cargo container 125, the container 125 may be transported via the trailer 130 to a final destination or a cargo container ship. Then, if desired, the cargo container 125 filled with the cargo 90 can be removed from the trailer 130 and loaded directly onto a cargo ship, a railroad car, or the like.

Alternate Embodiment

Figure 7A:
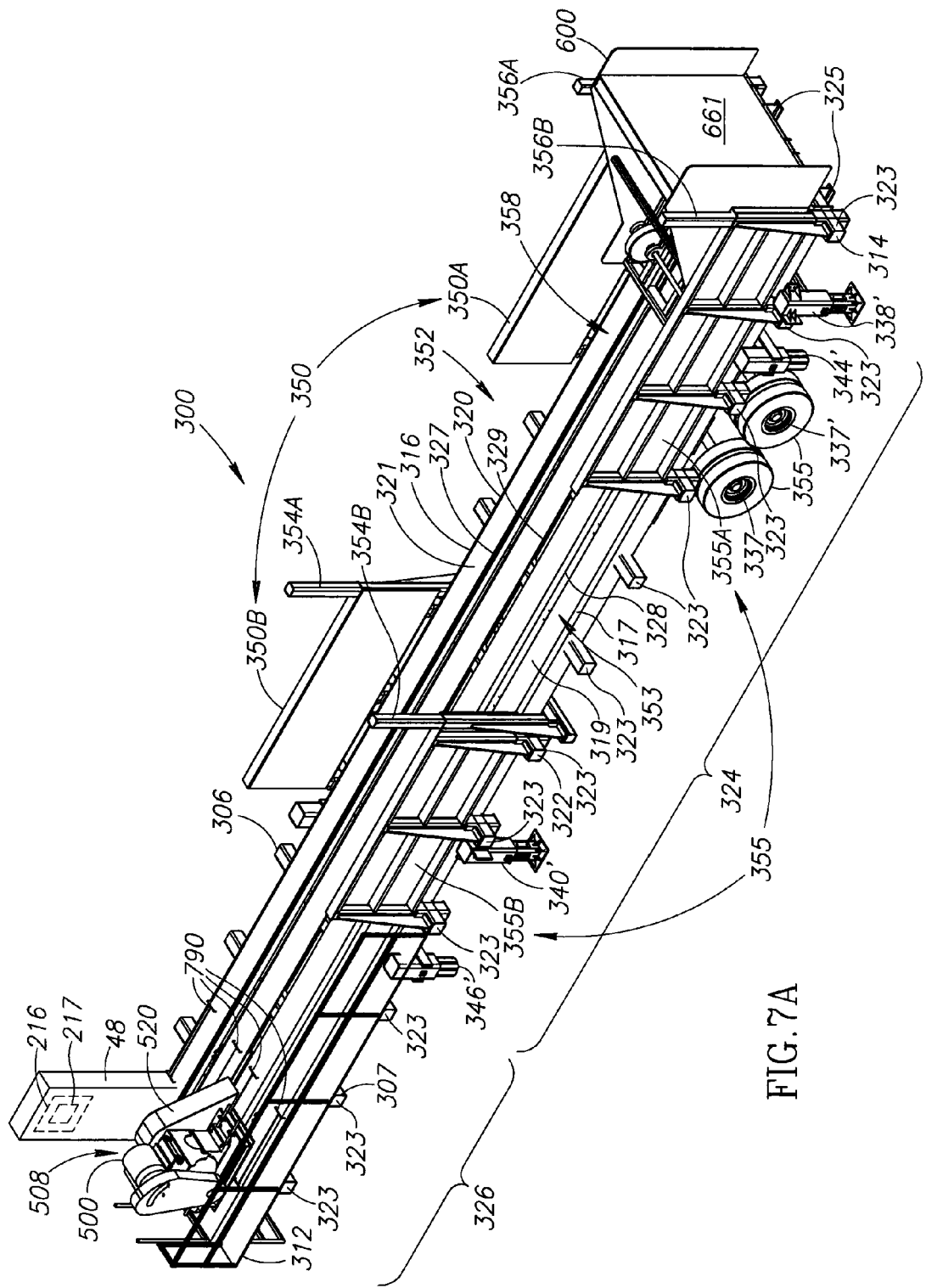
FIG. 7A is a perspective view of an alternate embodiment of a cargo loader apparatus depicted without its chains.

FIG. 7A illustrates an alternate embodiment of an apparatus for receiving the cargo 90 and transporting and/or loading that cargo into the cargo container 125. Like the apparatus 10, an apparatus 300 includes a height adjustable flat bed trailer 320 configured to be pulled behind a semi tractor (not shown). However, this is not a requirement and embodiments in which the apparatus 300 is configured to remain in a stationary position are within the scope of the present teachings. The trailer 320 is selectively couplable by a front end portion 312 to the tractor to be pulled thereby. The trailer 320 has a rear end portion 314 that may be selectively couplable to the rear portion 126 of the cargo container 125 when the apparatus 300 is transferring the cargo 90 into the opening 128 of the rear portion 126 of the cargo container 125. The trailer 320 may be coupled to the cargo container 125 using any method described above as suitable for coupling the trailer 20 to the cargo container 125. The trailer 320 of the apparatus 300 has an elongated frame 322 configured to support a generally rectangular-shaped bed 321.

Frame 322

The frame 322 includes a plurality of lateral support members 323 coupled to a plurality of longitudinal support members 325. The lateral support members 323 are longitudinally spaced from one another and extend laterally under the bed 321. The lateral support members 323 provide support to the underside of the bed 321 as well as attachment points for various other components of the apparatus 300. The longitudinal support members 325 are laterally spaced apart from one another, extend underneath the bed 321, and provide attachment points for various other components of the apparatus 300. The elongated frame 322 has a first longitudinally extending side portion 306 opposite a second longitudinally extending side portion 307.

The frame 322 has a rear cargo carrying section 324 opposite a front drive support section 326. In the embodiment depicted, the rear section 324 is longer than the front section 326. The length of the rear section 324 may be determined at least in part by the length of the cargo 90. For example, in embodiments in which the cargo 90 is a pile of logs, the length of the rear section 324 may be greater than or approximately equal to the length of the logs. By way of a non-limiting example, the rear section 324 may have a length of about 60 feet. One or more axles 337 and 337' are rotatably mounted on the rear section 324 and extend laterally under the bed 321. One or more wheels 335 are coupled to each of the axles 337 and 337' along the side portions 306 and 307 of the frame 322.

Figure 8:
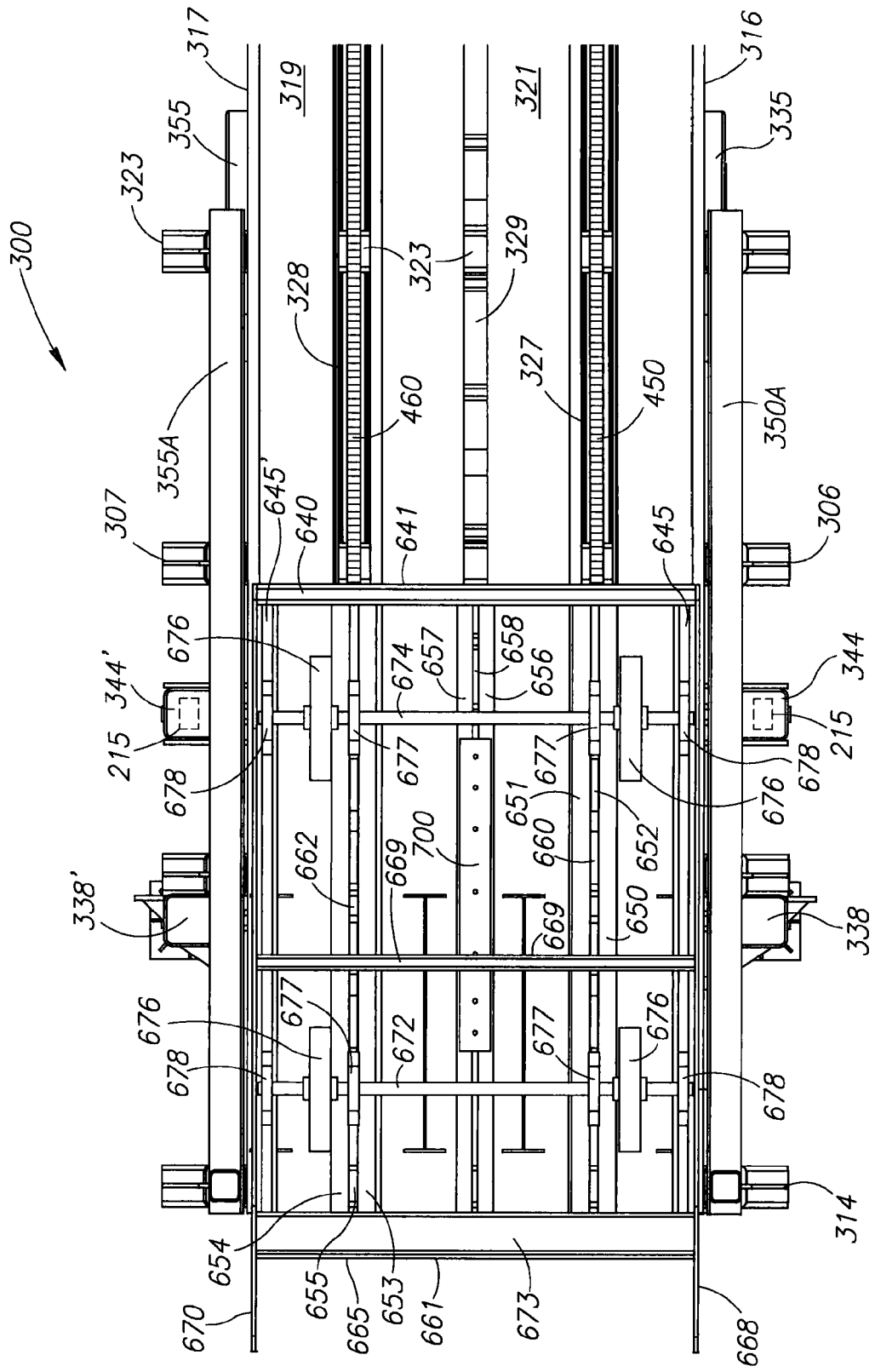
FIG. 8 is an enlarged top plan view of a rear portion of the cargo loader apparatus of FIG. 7A depicted with its chains.

As may best be viewed in FIG. 8, a first pair of manually adjustable support legs 338 and 338' is mounted to the rear section 324, one on each of the side portions 306 and 307, respectively, of the frame 322 between the axle 337' and the rear end portion 314 of the trailer 320. As may best be viewed in FIG. 9, a second pair of manually adjustable support legs 340 and 340' is mounted to the rear section 324, one on each of the side portions 306 and 307, respectively, of the frame 322 between the axle 337 and the front section 326 of the trailer 320. In the embodiment depicted in the drawings, the first pair of manually adjustable support legs 338 and 338' is spaced from the rear end portion 314 of the trailer 320 by a distance approximately equivalent to a distance that the second pair of manually adjustable support legs 340 and 340' is spaced from the front section 326 of the trailer 320. Thus, the center of the rear section 324 is located approximately midway between the first pair of manually adjustable support legs 338 and 338' and the second pair of manually adjustable support legs 340 and 340'.

Returning to FIG. 8, a first pair of adjustable hydraulic legs 344 and 344' is attached to the rear section 324, one on each of the side portions 306 and 307, respectively, of the frame 322 between the axle 337 and the first pair of manually adjustable support legs 338 and 338'. Returning to FIG. 9, a second pair of adjustable hydraulic legs 346 and 346' is attached to the front section 326, one on each of the side portions 306 and 307, respectively, of the frame 322 toward the rearward portion of the front section 326.

The tractor king pin 42 (see FIG. 1) is mounted to the underside of the front section 326. When the trailer 320 is pulled behind the tractor, the tractor king pin 42 is attached to the fifth wheel coupling on the tractor and the rear wheels 335 are disposed on the ground. To decouple the trailer 320 from the tractor, the hydraulic legs 344, 344', 346, and 346' are lowered to the ground. Then, the tractor king pin 42 detached from the fifth wheel coupling and the tractor driven forward and away from the trailer 320. Thus, the trailer 320 is supported on the ground by the hydraulic legs 344, 344', 346, and 346' and the rear wheels 335.

As will be described in more detail below, the length of the hydraulic legs 344, 344', 346, and 346' may be decreased or increased to lower or raise the bed 321 of the trailer 320 to a desired height needed to load or slide the cargo 90 from the bed 321 through the opening 128 in the cargo container 125 located at the rear end portion 314 of the trailer 320. Further, the lengths of the hydraulic legs 344, 344', 346, and 346' may be adjusted to level the bed 321 of the trailer 320.

Figure 9:
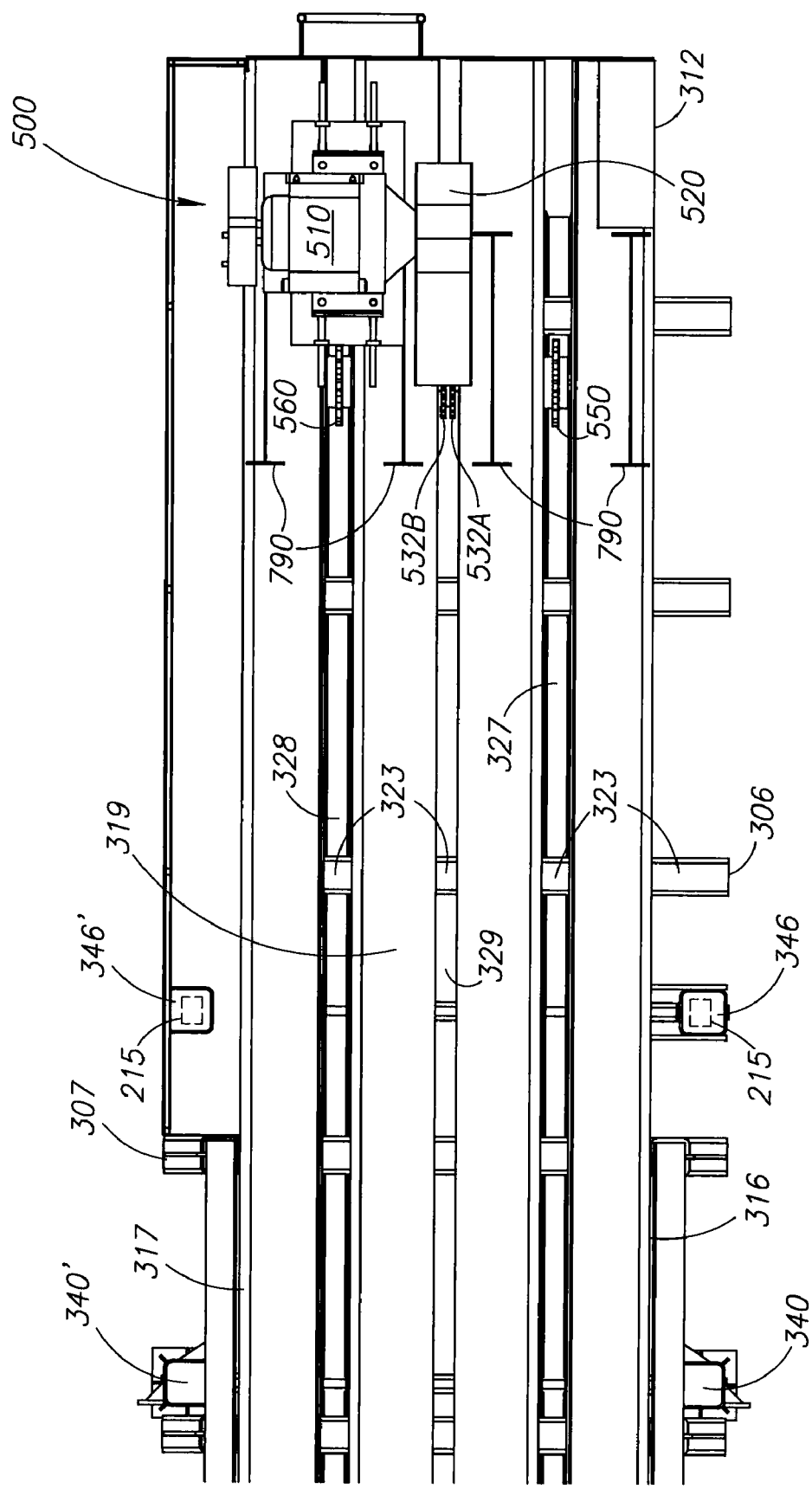
FIG. 9 is an enlarged top plan view of a front portion of the cargo loader apparatus of FIG. 7A depicted without its chains.

Each of the hydraulic legs 344, 344', 346, and 346' may include a housing mounted to the frame 322 and a movable ram (not shown). Referring to FIGS. 8 and 9, each of the hydraulic legs 344, 344', 346, and 346' may include a load sensor 215 inside the housing, the sensor being couplable to a scale unit 216 (see FIG. 7A) and configured to send an electronic signal indicating the amount of weight supported by the leg. The scale unit 216 may include a user interface or display 217 (see FIG. 7A). The sensors 215 each send an electronic signal to the scale unit 216, which the scale unit interprets to produce one or more weight measurements. For example, the scale unit 216 may produce a front weight measurement using the signals received from the sensors 215 for the hydraulic legs 346 and 346', and a rear weight measurement using the signals received from the sensors for the hydraulic legs 344 and 344'. Alternatively, the scale unit 216 may produce a weight measurement for each of the hydraulic legs 344, 344', 346, and 346'. By way of another example, the scale unit 216 may produce a single weight measurement based on all of the signals received from the hydraulic legs 344, 344', 346, and 346'. The weight measurement(s) may be displayed to an operator of the apparatus 300 using the scale unit's display 217.

Alternatively, a gauge (not shown) may be coupled to each supply line supplying hydraulic pressure to the hydraulic legs 344, 344', 346, and 346'. The gauges may display the pressure in the air supply lines. The operator may use the values displayed by the gauges to determine one or more weight measurements using mathematical formulas known in the art.

Bed 321

The bed 321 is configured to receive and support the cargo 90. The bed 321 has a first longitudinal side portion 316, which is adjacent the side portion 306 of the frame 322, located opposite a second longitudinal side portion 317, which is adjacent the side portion 307 of the frame 322. The bed 321 includes a substantially planar upper surface 319.

Figure 10:
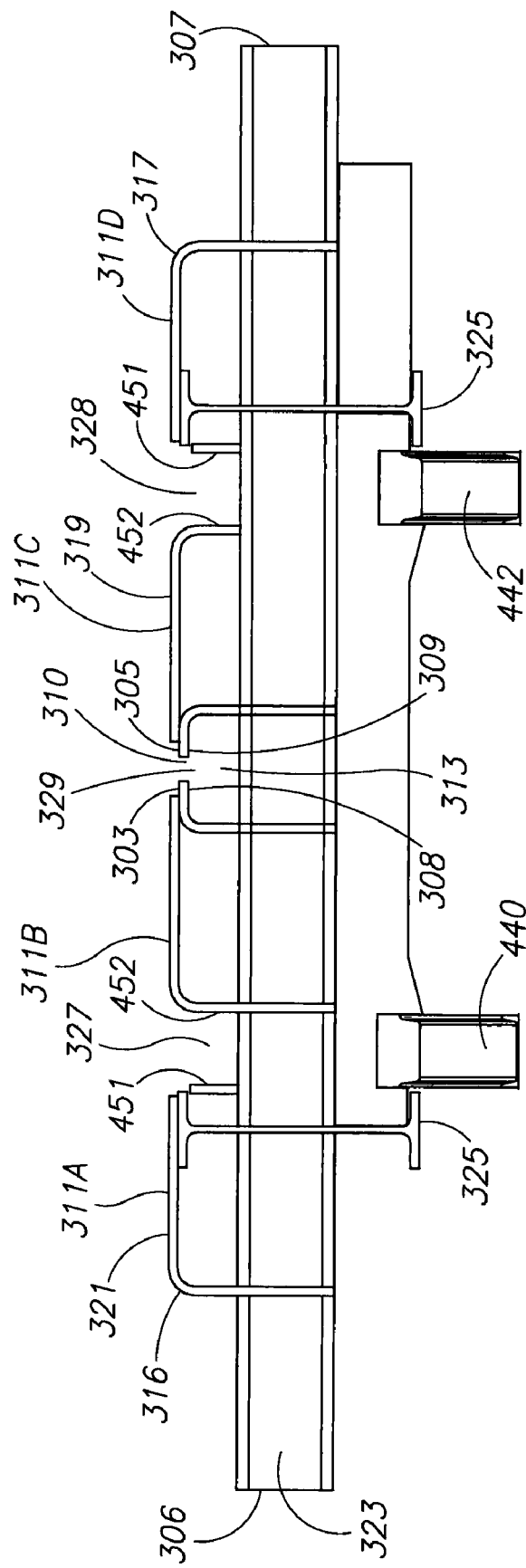
FIG. 10 is an enlarged lateral cross-sectional view of the bed and frame of the cargo loader apparatus of FIG. 7A.

In the embodiment depicted in FIG. 10, the bed 321 is constructed from four elongated laterally spaced deck plates 311A, 311B, 311C, and 311D mounted to the frame 322. The deck plate 311A is adjacent the first side portion 316 of the bed 321 and the deck plate 311D is adjacent the second side portion 317 of the bed 321. Three laterally spaced apart longitudinally extending channels, a first chain guide channel 327, a second chain guide channel 328, and a center channel 329, are defined between the deck plates 311A, 311B, 311C, and 311D and traverse the length of the bed 321. The center channel 329 is located between the first and second chain guide channels 327 and 328. The first chain guide channel 327 is defined between the deck plate 311A and the deck plate 311B. The second chain guide channel 328 is defined between the deck plate 311C and the deck plate 311D. The center channel 329 is defined between the deck plate 311B and the deck plate 311C.

Referring to FIG. 8, the first chain guide channel 327 is configured to guide a first chain 450 and the second chain guide channel 328 is configured to guide a second chain 460 longitudinally along the bed 321. For illustrative purposes, the chains 450 and 460 have been omitted from all of the figures except FIG. 8. Each of the chains 450 and 460 extend from the front end portion 312 (see FIG. 9) of the trailer 320 to the rear end portion 314 and back again to the front end portion in a continuous loop. Thus, only a first portion of the chains 450 and 460 is located within the chain guide channels 327 and 328 near the surface 319 of the bed 321.

Returning to FIG. 10, the chain guide channels 327 and 328 each include a pair of spaced apart sidewalls 451 and 452 configured to maintain the chains 450 and 460 laterally within the channels 327 and 328, respectively. By way of a non-limiting example, the lateral distance between the sidewalls 451 and 452 may be about one inch greater than the width of each of the chains 450 and 460. Each of the chain guide channels 327 and 328 is open along the surface 319 of the bed 321 to provide access from above to each of the chains 450 and 460.

While the apparatus 300 is depicted as including two chains 450 and 460, those of ordinary skill in the art appreciate that the apparatus may be configured to use a single chain or more than two chains, and such embodiments are within the scope of the present teachings.

The center channel 329 includes a pair of inwardly extending longitudinally aligned juxtaposed flanges 303 and 305 spaced from the surface 319 of the bed 321. A slot 310 substantially similar to the slot 172 (see FIG. 6) of the apparatus 10 is defined between the flanges 303 and 305. The center channel 329 is in communication with a void or chamber 313 located below the deck plates 311B and 311C via the slot 310. Each of the flanges 303 and 305 has a lower surface 308 and 309 defining an upper portion of the chamber 313.

Figure 7B:
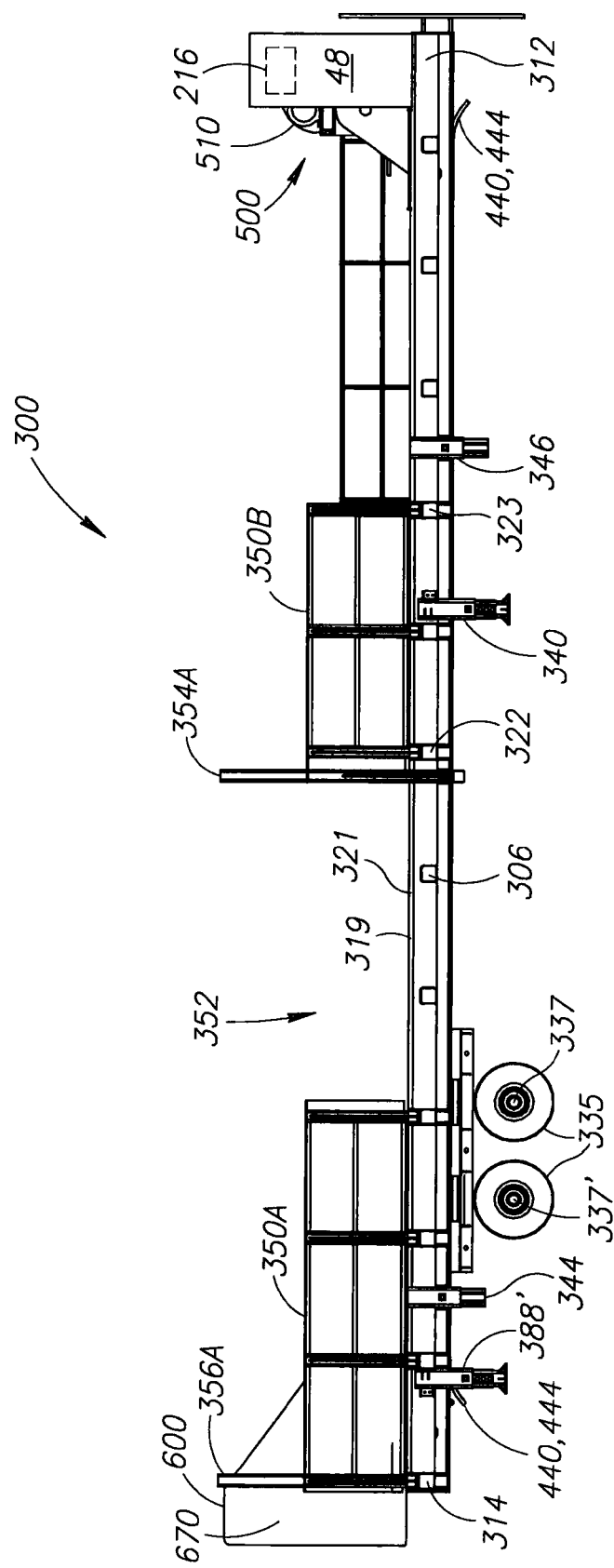
FIG. 7B is a side view of the cargo loader apparatus of FIG. 7A depicted without its chains.

Below each of the first and second chain guide channels 327 and 328 is a return chain guide 440 and 442, respectively. The return chain guides 440 and 442 are coupled to the frame 322 under the bed 321. A second portion of the chains 450 and 460 is located within the return chain guides 440 and 442 below the bed 321. Referring to FIG. 7B, the return chain guides 440 and 442 may each include downward curving end portions 444 through which the chains 450 and 460 exit the return chain guides 440 and 442.

Rotational Drive Assembly 500

Turning to FIG. 7A, a rotational drive assembly 500 is affixed to the surface 319 of the bed 321 and rotatably coupled to each of the chains 450 and 460 (see FIG. 8) to drive them. When driven, the first and second chains 450 and 460 travel in the same direction within the chain guide channels 327 and 328, respectively. The chains 450 and 460 are supported by and travel on the plurality of lateral support members 323, exposed by the chain guide channels 327 and 328. In alternate embodiments, the channels 327 and 328 may have closed portions that support the chains 450 and 460. When the chains 450 and 460 are driven within the chain guide channels 327 and 328 toward the rear end portion 314 of the trailer 320, the return chain guides 440 and 442 (see FIG. 10) located below the bed 321 guide the chains 450 and 460 back to the drive assembly 500.

Figure 11:
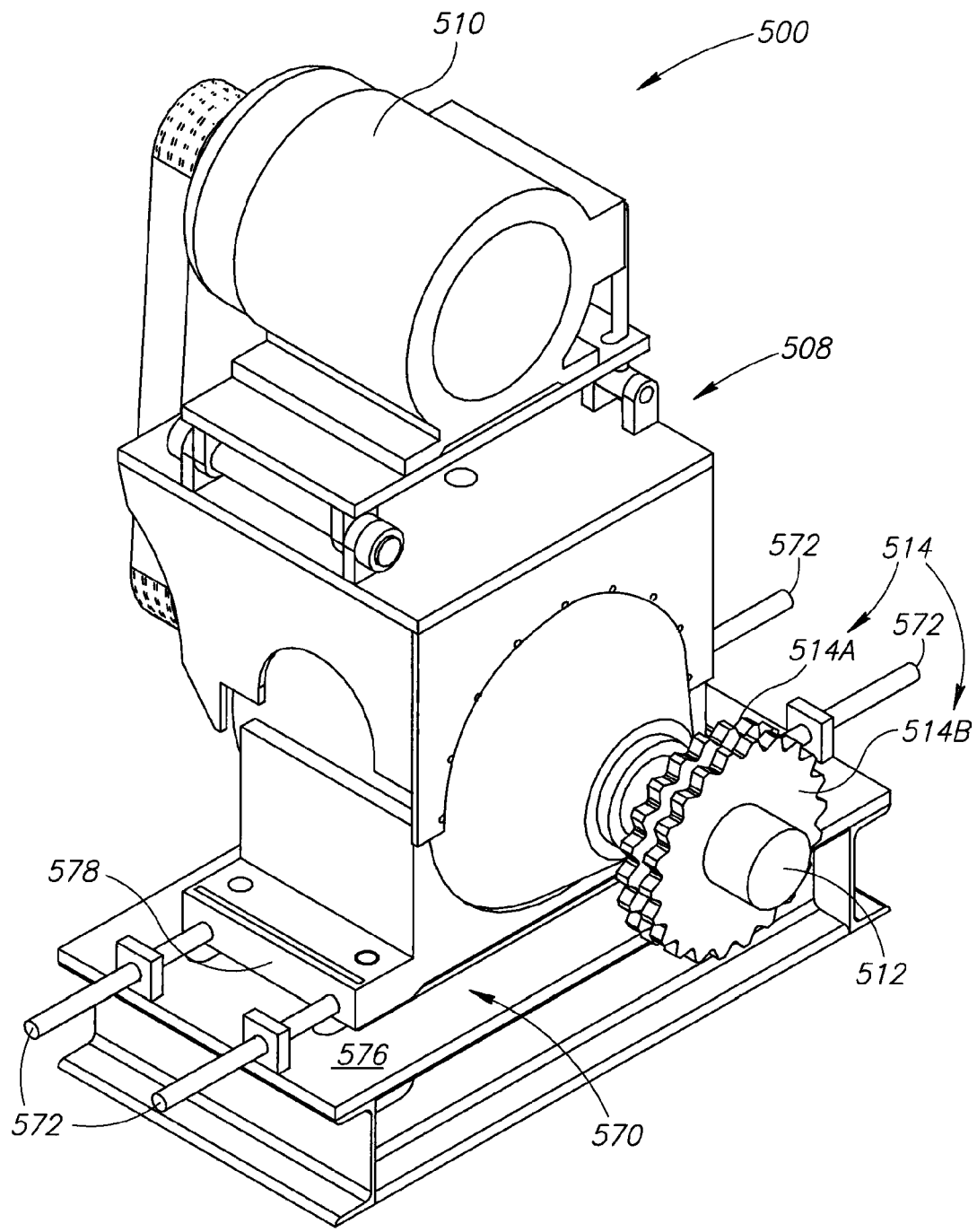
FIG. 11 is a perspective view of an electric motor portion of a drive assembly of the cargo loader apparatus of FIG. 7A.

As may best be viewed in FIG. 11, the rotational drive assembly 500 includes a motor assembly 508 having a motor 510 coupled to and configured to rotate a drive shaft 512. The motor 510 may include any suitable motor known in the art, including an electric motor, a hydraulic motor, and the like. At least one sprocket 514 is coupled to the drive shaft 512 for rotation thereby. In the embodiment depicted in FIG. 11, a pair of sprockets 514A and 514B are coupled to the drive shaft 512.

Figure 12:
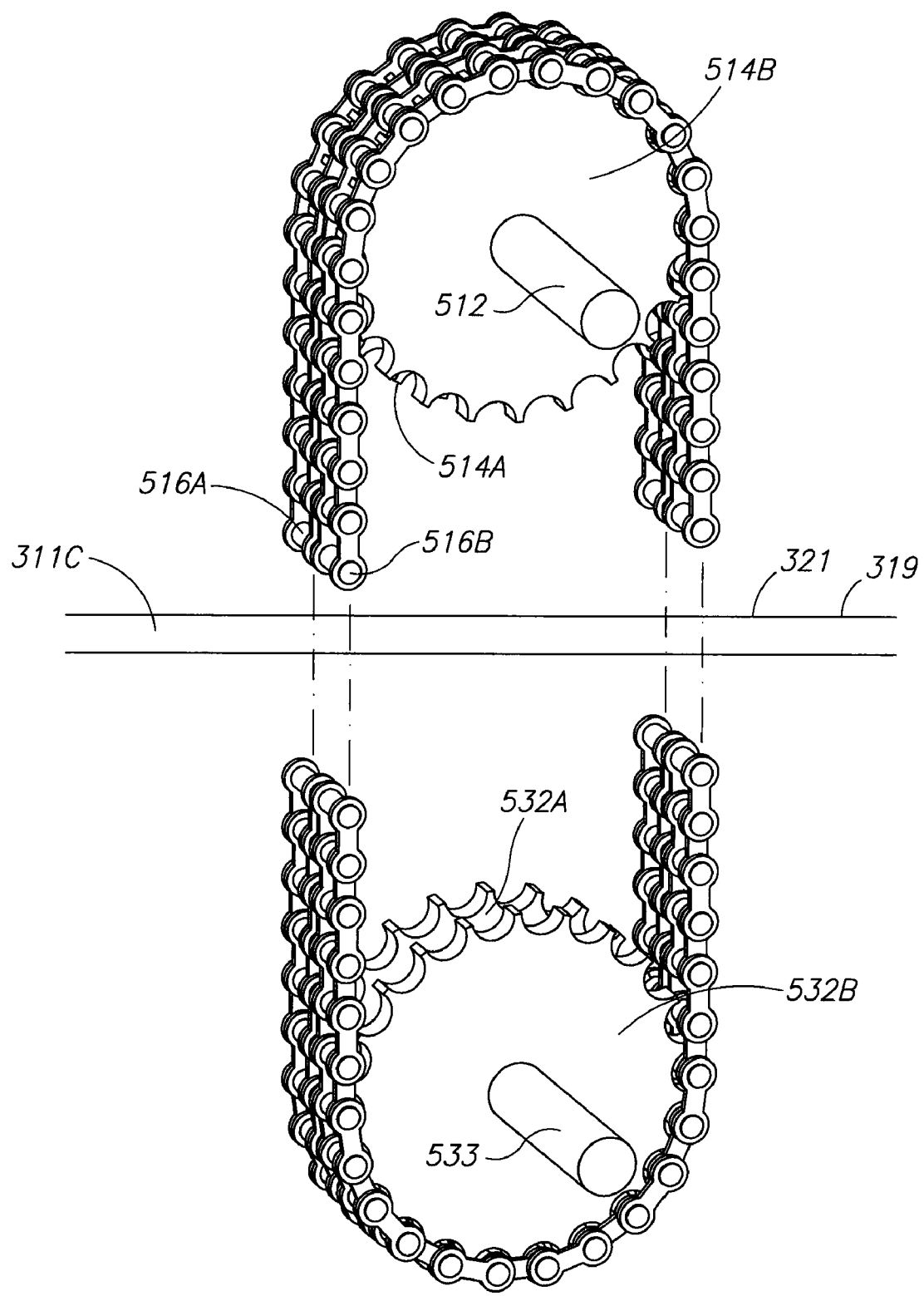
FIG. 12 is a perspective view of a linkage between the electric motor portion of the drive assembly of FIG. 11 and a front drive assembly located under the bed.

Referring to FIG. 12, one or more chains 516 are coupled to the sprockets 514A and 514B and driven thereby. For illustrative purposes, separate chains 516A and 516B are shown coupled to the sprockets 514A and 514B, respectively; however, this is not a requirement. The chains 516A and 516B extend from the sprockets 514A and 514B, respectively, located above the surface 319 of the bed 321 downwardly through the center channel 329. An optional guard 520 (see FIGS. 7A and 9) configured to encase the sprockets 514A and 514B and at least a portion of the chains 516A and 516B may be coupled to the drive assembly 500.

Figure 13:
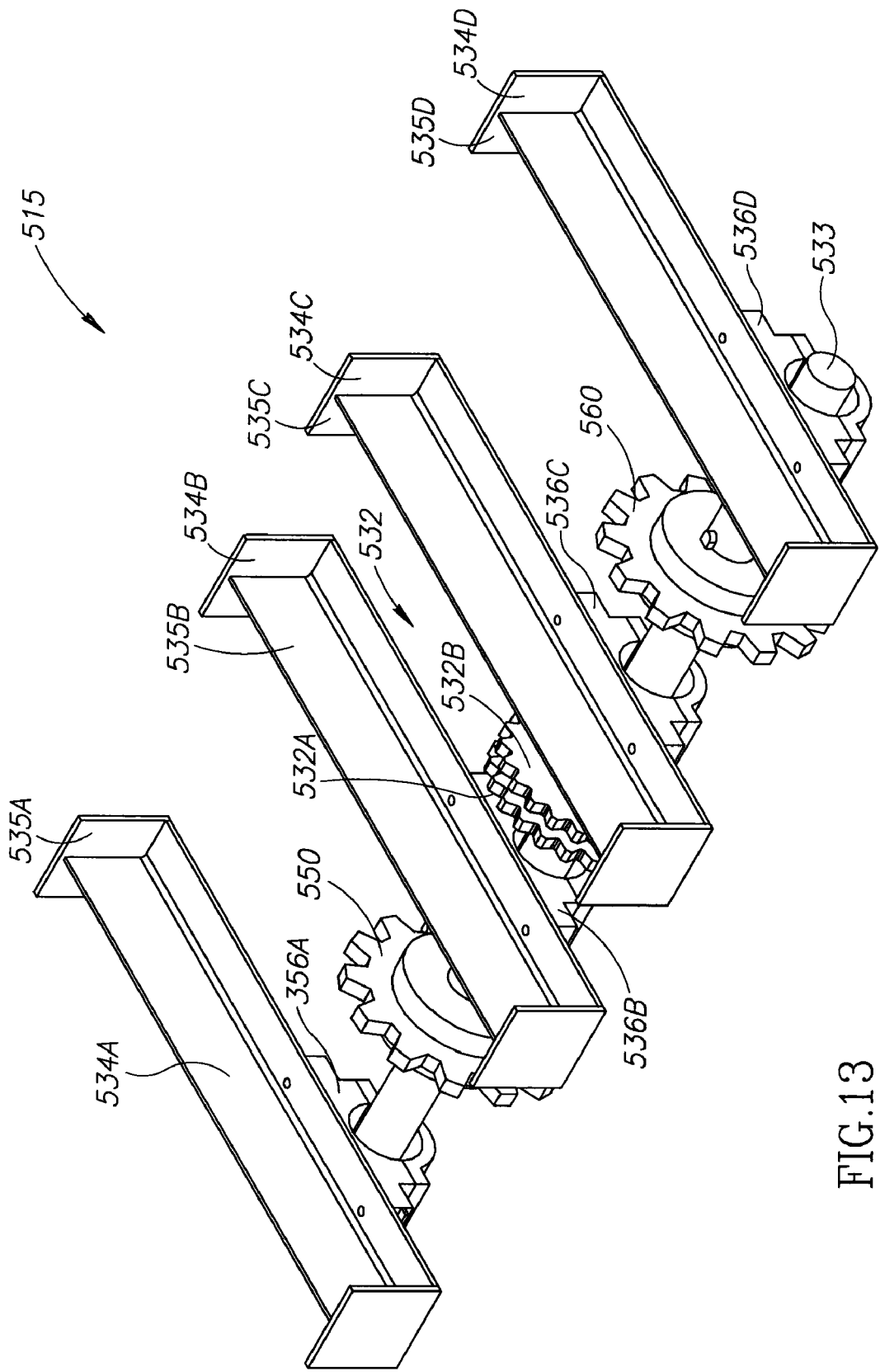
FIG. 13 is a perspective view of the front drive assembly located under the front portion of the bed.

As mentioned above, the chains 516A and 516B extend from the sprockets 514A and 514B located above the surface 319 of the bed 321 downwardly through the center channel 329. Referring to FIGS. 12 and 13, the rotational drive assembly 500 includes a front drive assembly 515 mounted to the front portion 326 of the frame 322 under the bed 321. The front drive assembly 515 includes at least one sprocket 532 coupled to the chains 516A and 516B and mounted to at least one drive shaft 533. For illustrative purposes, each of the chains 516A and 516B is shown coupled to a separate sprocket 532A and 532B; however, this is not a requirement. Thus, in the embodiment described, the sprocket 514A drives the chain 516A that in turn drives the sprocket 532A and the sprocket 514B drives the chain 516B that in turn drives the sprocket 532B. For illustrative purposes, it is assumed that the sprockets 532A and 532B are coupled to a single continuous drive shaft 533. However, this is not a requirement and embodiments in which the sprockets 532A and 532B are each coupled to separate drive shafts are within the scope of the present teachings.

As illustrated in FIGS. 9 and 13, the front drive assembly 515 includes a first sprocket 550 mounted on the drive shaft 533 and aligned with the first chain guide channel 327 and configured to engage the first chain 450 (see FIG. 8). The first chain 450 is looped around the first sprocket 550, which imparts a drive force thereto causing the chain 450 to selectively move in the first chain guide channel 327 either toward or away from the rear end portion 314 of the trailer 320.

The front drive assembly 515 includes a second sprocket 560 mounted on the drive shaft 533 and aligned with the second chain guide channel 328, and configured to engage the second chain 460. The second chain 460 is looped around the second sprocket 560, which imparts a drive force thereto causing the chain 460 to move in the second chain guide channel 328 in the same first direction in which the first chain 450 is moving in the first chain guide channel 327.

The drive shaft 533 is rotatably mounted to the frame 322 by a plurality of spaced apart framing members 534A, 534B, 534C, and 534D that are each coupled by their upper portions 535A, 535B, 535C, and 535D, respectively to the frame 322. Each of the framing members 534A, 534B, 534C, and 534D includes a bearing assembly 536A, 536B, 536C, and 536D, respectively, configured to house a portion of the drive shaft 533 and permit it to rotate relative to the frame 322.

In the embodiment depicted, the framing member 534A is adjacent the side portion 316 of the bed 321 and the framing member 534D is adjacent the side portion 317 of the bed 321. The framing member 534B is located between the sprocket 550 and the sprocket 532A. The framing member 534C is located between the sprocket 560 and the sprocket 532B. Thus, the bearing assemblies 536A and 536D house portions of the drive shaft 533 located at the ends of the drive shaft 533. The bearing assembly 536B houses a portion of the drive shaft 533 located between the sprocket 550 and the sprocket 532A, and the bearing assembly 536C houses a portion of the drive shaft 533 located between the sprocket 560 and the sprocket 532B.

Figure 14:
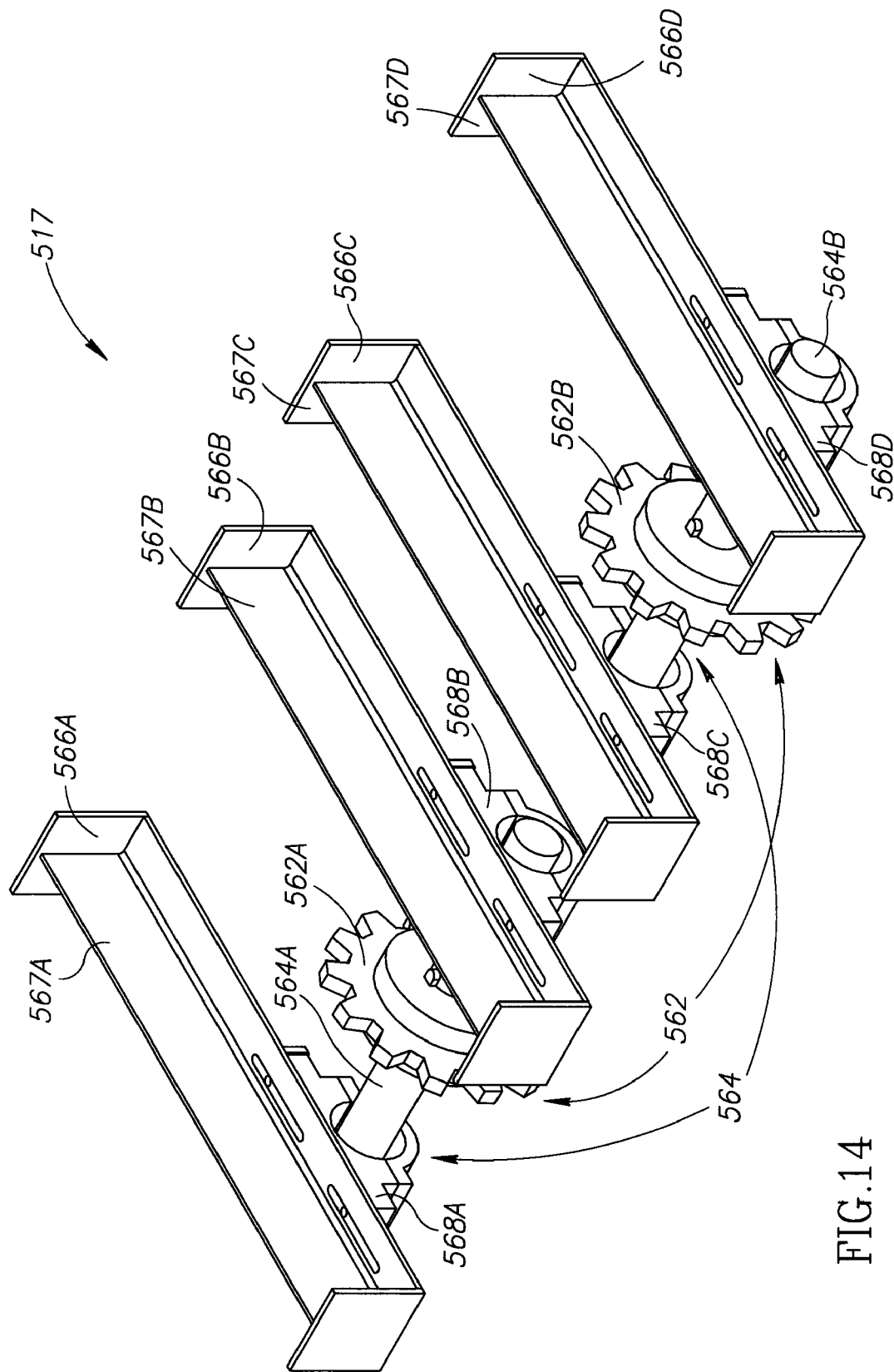
FIG. 14 is a perspective view of the rear drive assembly located under the rear portion of the bed.
Figure 15:
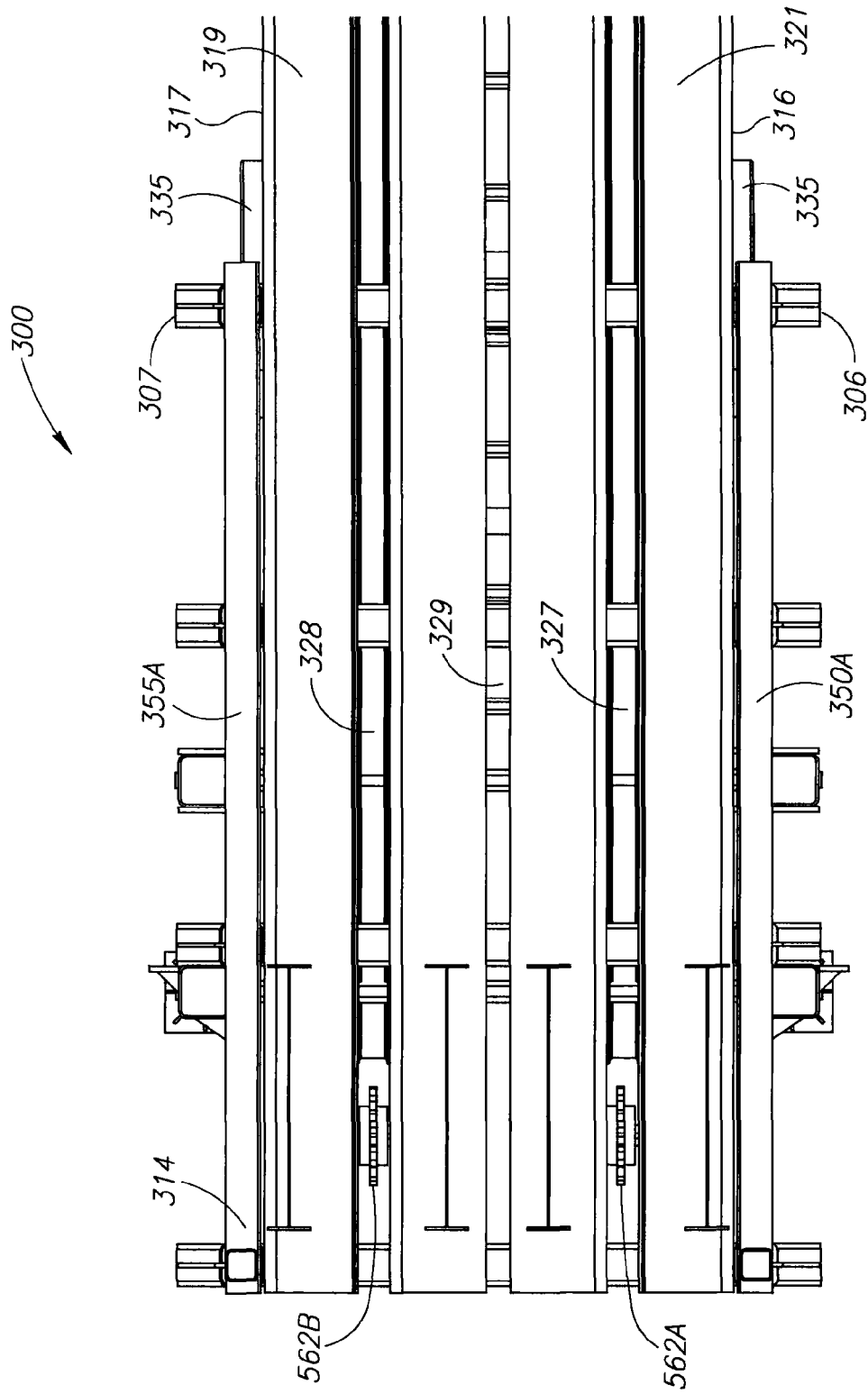
FIG. 15 is an enlarged top plan view of the rear portion of the cargo loader apparatus of FIG. 7B depicted without its chains and with the carriage moved from the rear portion.

Referring to FIGS. 14 and 15, the rotational drive assembly 500 includes a rear drive assembly 517 mounted to the rear portion 324 of the frame 322 under the bed 321. The rear drive assembly 517 includes one or more sprockets 562 coupled to at least one drive shaft 564 rotatably mounted to the frame 322 under the bed 321. For illustrative purposes, the chains 550 and 560 are shown coupled to sprockets 562A and 562B, respectively. For illustrative purposes, the sprockets 562A and 562B are shown each coupled to a separate drive shaft 564A and 564B, respectively. However, this is not a requirement and embodiments in which the sprockets 562A and 562B are both coupled to single continuous drive shaft are within the scope of the present teachings.

As may best be viewed in FIG. 15, the sprocket 562A is aligned with the first chain guide channel 327 and configured to engage the first chain 450 (see FIG. 8). The sprocket 562B is aligned with the second chain guide channel 328 and configured to engage the first chain 460 (see FIG. 8). The chain 450 loops around the sprocket 562A and the chain 460 loops around the sprocket 562B.

Turning to FIG. 14, the drive shaft 564A is rotatably mounted to the frame 322 by a pair of spaced apart framing members 566A and 566B that are each coupled by their upper portions 567A and 567B, respectively, to the frame 322. Each of the framing members 566A and 566B includes a bearing assembly 568A and 568B, respectively, configured to house a portion of the drive shaft 564A and permit it to rotate relative to the frame 322. The drive shaft 564B is rotatably mounted to the frame 322 by a pair of spaced apart framing members 566C and 566D that are each coupled by their upper portions 567C and 567D, respectively, to the frame 322. Each of the framing members 566C and 566D includes a bearing assembly 568C and 568D, respectively, configured to house a portion of the drive shaft 564B and permit it to rotate relative to the frame 322.

In the embodiment depicted, the framing member 566A is adjacent the side portion 316 of the bed 321 and the framing member 566D is adjacent the side portion 317 of the bed 321. The framing member 566B is located between the sprocket 562A and the center channel 329. The framing member 566C is located between the sprocket 562B and the center channel 329. The bearing assemblies 568A and 568B house end portions of the drive shaft 564A, and the assemblies 568C and 568D house end portions of the drive shaft 564B.

Returning to FIGS. 11 and 12, as the motor 510 rotates the drive shaft 512, the sprockets 514A and 514B rotate and drive the chains 516A and 516B. The chains 516A and 516B in turn rotate the sprockets 532A and 532B, which cause the drive shaft 533 to rotate. Referring to FIG. 13, the rotating drive shaft 533 rotates the first and second sprockets 550 and 560. Depending upon the direction in which the motor 510 rotates the drive shaft 512, the sprockets 550 and 560 drive the chains 450 and 460, respectively, either toward or away from the rear end portion 314 of the trailer 320 relative to the surface 319 of the bed 321. Turning to FIGS. 14 and 15, the first portions of the chains 550 and 560 travel in the chain guide channels 327 and 328, respectively, loop around the sprockets 562A and 562B, respectively, and cause the drive shafts 564A and 564B, respectively, to rotate (in the same direction). Referring to FIG. 10, the second portions of the chains 450 and 460 travel in the return chain guides 440 and 442, respectively, mounted to the frame 322 under the bed 321.

Returning to FIG. 11, the motor assembly 508 may be mounted to the bed 321 by a positioning assembly 570 configured to adjust the position of the motor assembly 508 (and thus the sprockets 514A and 514B) relative to the center channel 329 and/or the sprockets 532A and 532B to properly align the chains 516A and 516B, respectively, extending therebetween. In the embodiment depicted in FIG. 11, the positioning assembly 570 includes four threaded bolts 572 threadedly received into a base portion 576 mounted to the bed 321. The bolts 572 are terminated by a movable tray or plate 578 resting on the base portion 576, the plate 578 being slidable upon the base portion 576. One or more bolts (not shown) may be used to couple the plate 578 to slots (not shown) formed in the base portion 576. The slots may restrict the movement of the plate 578 relative to the base portion 576. The motor assembly 508 may be mounted inside the plate 578 and the bolts 572 selectively turned (thereby advance them toward or backing them away from the motor assembly 508) to adjust the positioning of the plate 578 and thereby the motor assembly 508 relative to the base portion 576.

Returning to FIG. 7A, two discontinuous upright and confronting sidewalls 350 and 355 are mounted on the opposite sides 306 and 307, respectively, of the frame 322 adjacent to and extending longitudinally along the opposite sides 316 and 317, respectively, of the bed 321. The sidewall 350 has a rear portion 350A separated from a front portion 350B by an opening 352. The sidewall 355 has a rear portion 355A separated from a front portion 355B by an opening 353. An elongated longitudinally extending passageway 358 with a front-rear orientation is defined between the discontinuous sidewalls 350 and 355.

Optionally, the height adjustable hydraulic vertical supports 53 and 56 (describe above and illustrated in FIG. 1) may be coupled to the back portion 350A and/or the front portion 350B of the sidewalls 350. Further, the height adjustable hydraulic vertical supports 53 and 56 may be coupled to the back portion 355A and/or the front portion 355B of the sidewalls 355.

To aid with loading the cargo 90 into the trailer 320, the trailer may include a first pair of upright guide posts 354A and 354B mounted to the opposite sides 306 and 307, respectively, of the frame 322. The guide posts 354A and 354B may be located within or adjacent to the openings 352 and 353, respectively. In the embodiment depicted in FIG. 7A, the guide post 354A is adjacent the front portion 350B of the sidewall 350 near the opening 352 and the guide post 354B is adjacent the front portion 355B of the sidewall 355 near the opening 353. To aid with aligning the container 125 with the bed 321 of the trailer 320, the trailer may include a second pair of upright guide posts 356A and 356B mounted to the opposite sides 306 and 307, respectively, of the frame 322 adjacent to the rear end portion 314 of the trailer 320.

Figure 21:
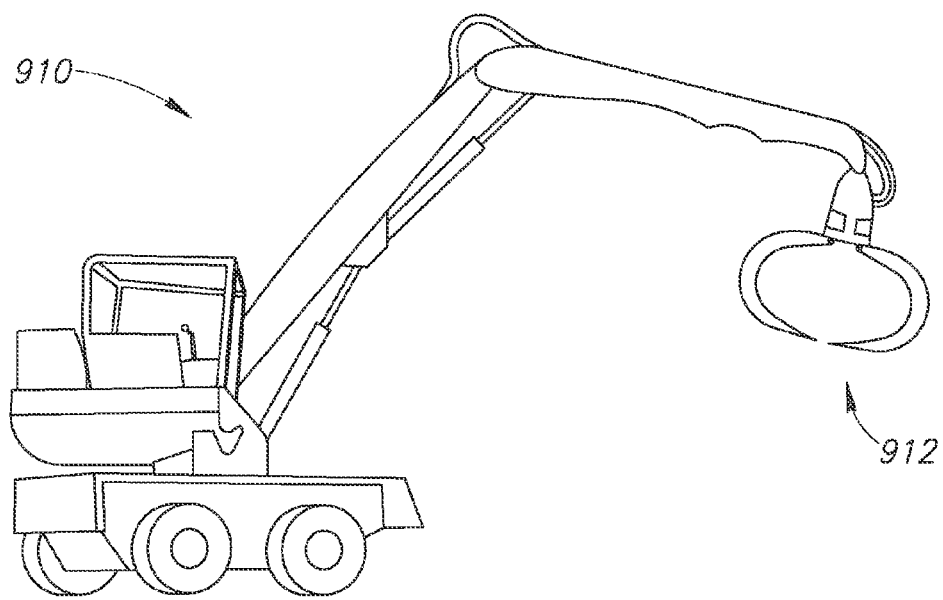
FIG. 21 is a perspective view of a conventional crane having a claw for use with the cargo loader apparatus of FIG. 1.

When the cargo 90 is a pile of logs, the logs are loaded onto the bed 321 of the trailer 320 between the sidewalls 350 and 355 by a crane 910 (see FIG. 21) or similar device having a claw 912 (see FIG. 21) or similar gripping mechanism. To release the logs, the claw 912 (or similar gripping mechanism) must open, enlarging the spatial envelop occupied by the claw. To prevent interference between the sidewalls 350 and 355 and the open claw, the claw 912 may be positioned inside the openings 352 and 353 when loading logs into the trailer 320. Alternatively, the cargo 90 may be loaded onto the bed 321 by a loader, such as a forklift, having forks or tines that are positioned inside the openings 352 and 353. The loader may lift the cargo 90 over both portions of the discontinuous sidewalls 350 and 355. In both situations, the cargo 90 is positioned in the passageway 358 defined between the discontinuous sidewalls 350 and 355.

Figure 20:
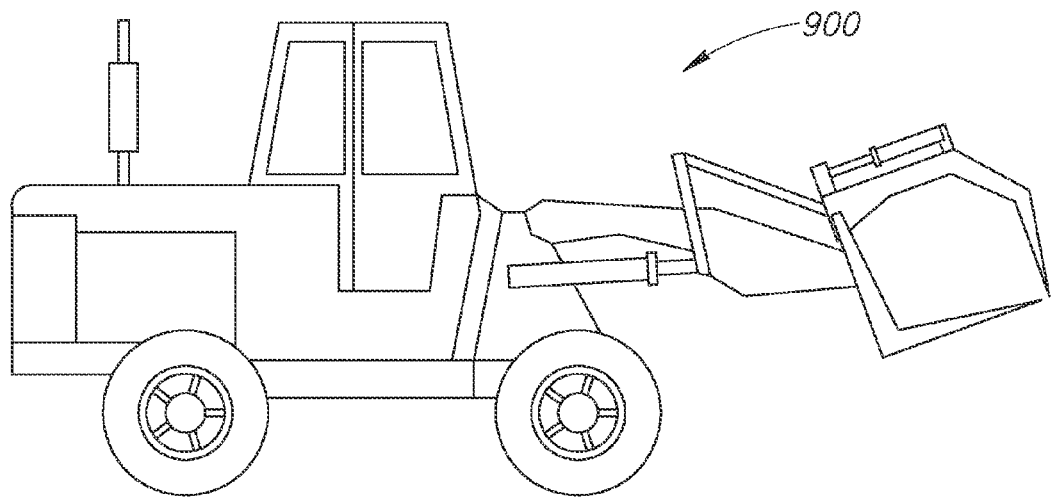
FIG. 20 is a side view of conventional log handling equipment for use with the cargo loader apparatus of FIG. 1.

Non-limiting examples of equipment suitable for loading the cargo 90 into the apparatus 300 include large log handling equipment 900 (see FIG. 20I) having a front-end grapple. Suitable log handling equipment may be purchased from Wagner, Lautereau, and the like. The openings 352 and 353 of the cargo containing sidewalls 350 and 355 allow the grapple of the log handling equipment 900 un-obstructed mechanical access to the bed 321 of the trailer 320 during the loading process.

One method of loading the cargo 90 into the apparatus 300 includes the use of an onsite auxiliary scale unit (not shown). The scale unit is configured to be loaded with the cargo 90 (e.g., logs from a log stack). Then, the scale unit is operated to weight the cargo 90 loaded onto the scale unit. If the cargo 90 is too heavy, some may be removed from the scale unit. On the other hand, if the cargo 90 is too light, additional cargo may be added to the scale unit. Weighing the cargo 90 before loading it onto the apparatus 300, referred to as "pre-staging," may allow for more efficient loading of the cargo container 125. While the apparatus 300 is busy loading cargo 90 into the cargo container 125, the next load can be pre-staged. With appropriate cargo 90 handling equipment, an entire container load of cargo can be transferred from the auxiliary scale unit to the bed 321 of the apparatus 300 for loading into the cargo container 125. The auxiliary scale unit may be used instead of the scale unit described above.

Movable Carriage 600

Figure 7C:
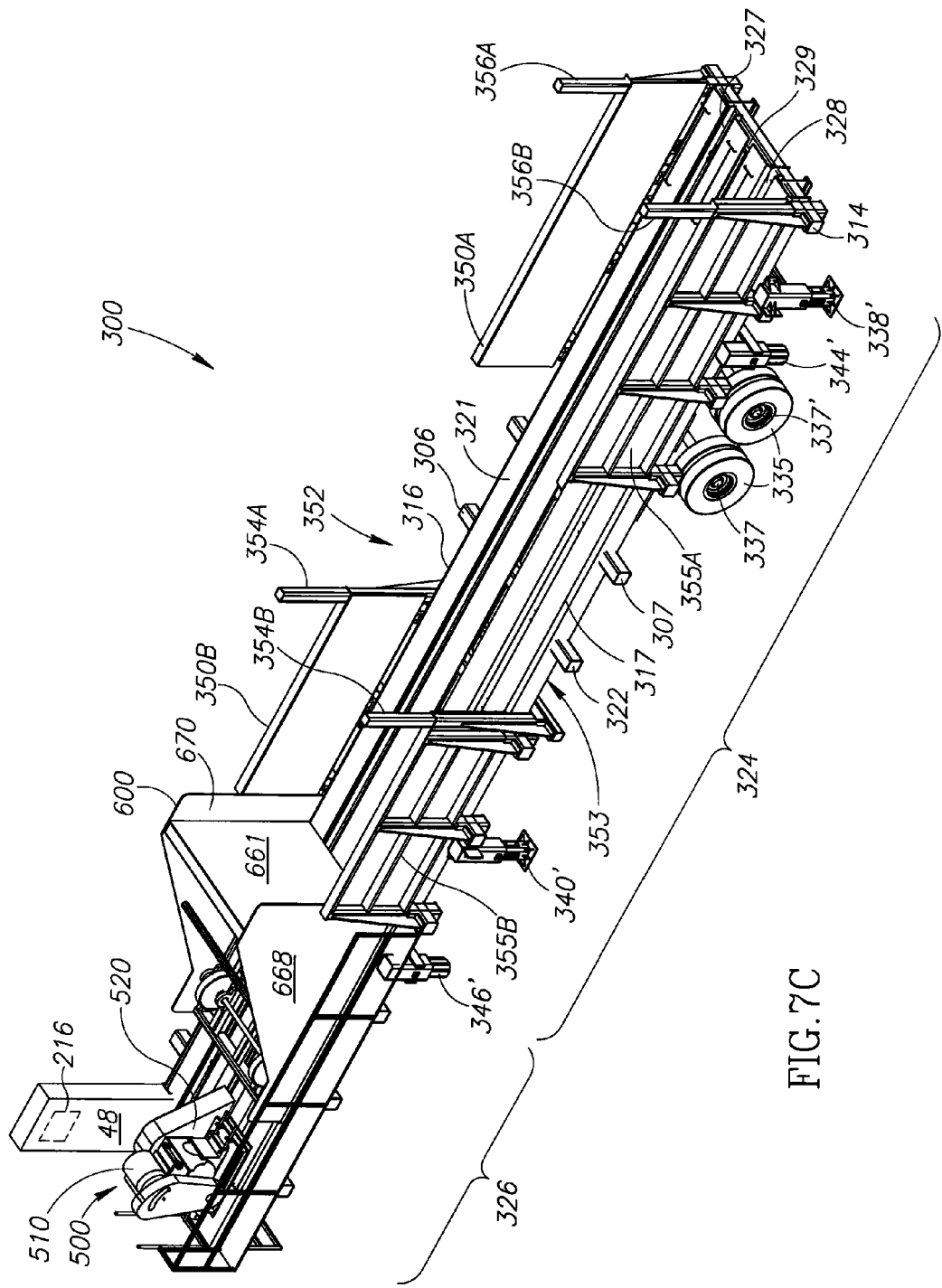
FIG. 7C is a perspective view of the cargo loader apparatus of FIG. 7A depicted without its chains and with its carriage positioned on a front portion of a bed in a cargo receiving position.
Figure 16:
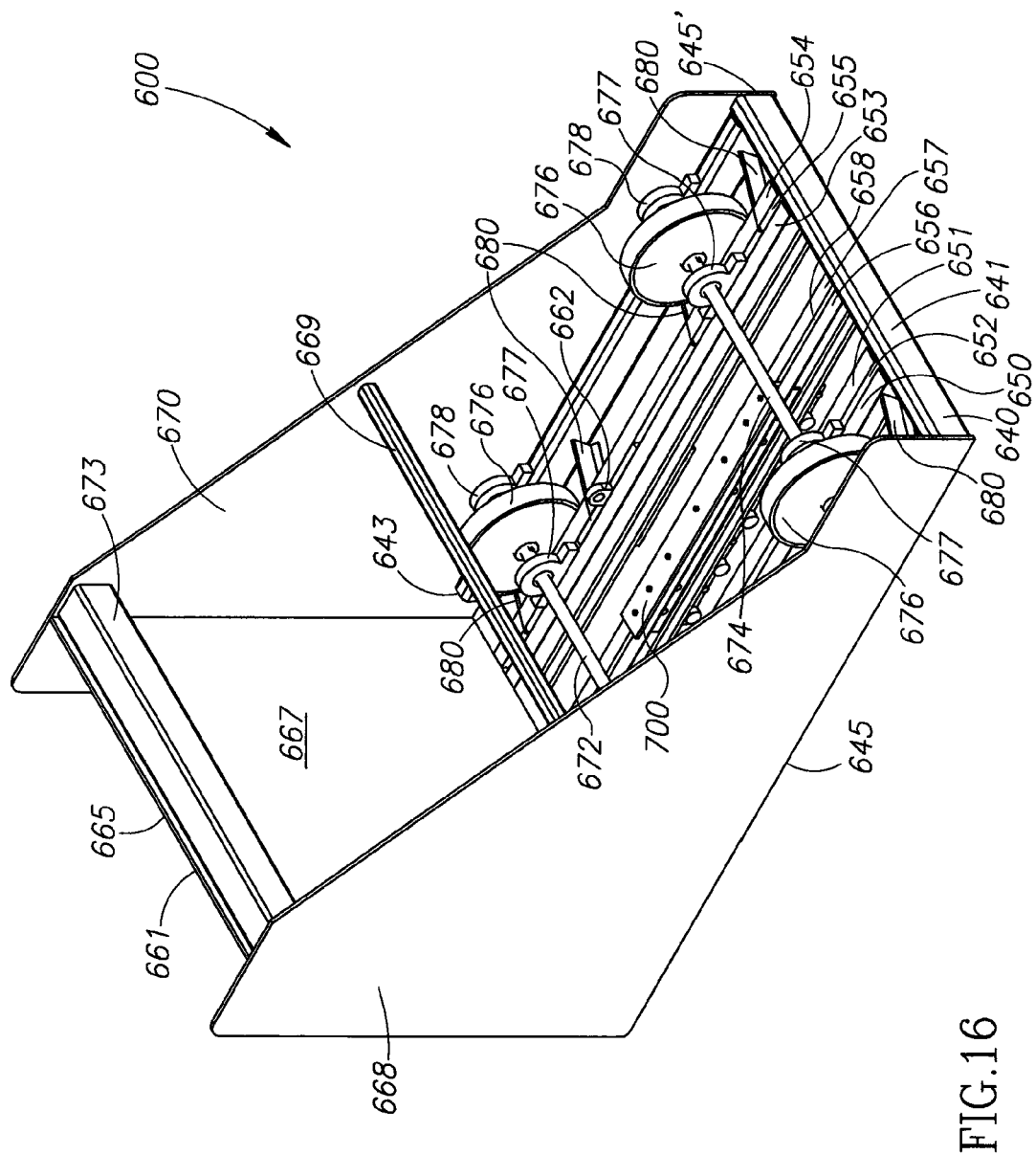
FIG. 16 is a perspective view of the carriage of the cargo loader apparatus of FIG. 7A.

Referring to FIGS. 8 and 16, like the apparatus 10, the apparatus 300 includes a movable sled or carriage 600 mounted on the bed 321 of the trailer 320 configured to move forward and backward longitudinally over the bed 321 inside the passageway 358 between the discontinuous sidewalls 350 and 355. FIGS. 7A, 7B, and 8 depict the carriage 600 in its rearmost position. FIG. 7C depicts the carriage 600 in its forwardmost position. When the carriage 600 is in the position depicted in FIG. 7C, the apparatus 300 is ready to receive the cargo 90.

The carriage 600 includes a base portion 640 disposed on the bed 321. The base portion 640 has a front portion 641, a rear portion 643, and two opposing sides portions 645 and 645' substantially aligned longitudinally with the side portions 316 and 317, respectively, of the bed 321. The base portion 640 includes a first pair of laterally spaced apart rails 650 and 651, defining a first slot 652 longitudinally aligned with the first chain guide channel 327. The base portion 640 includes a second pair of laterally spaced apart rails 653 and 654, defining a second slot 655 longitudinally aligned with the second chain guide channel 328. The base portion 640 includes a third pair of laterally spaced apart rails 656 and 657, defining a third slot 658 longitudinally aligned with the center channel 329.

A first anchor assembly 660 coupled to the base portion 640 and disposed inside the first slot 652 extends from the base portion 640 through the first slot into the first chain guide channel 327 whereat the first anchor assembly 660 is coupled to the first chain 450 in the first chain guide channel 327. A second anchor assembly 662 coupled to the base portion 640 and disposed inside the second slot 655 extends from the base portion 640 through the second slot into the second chain guide channel 328 whereat the second anchor assembly 662 is coupled to the second chain 460 in the second chain guide channel 328. As the chains 450 and 460 are driven by the drive assembly 500, they pull the carriage 600, which is tethered to the chains 450 and 460 by the anchor assemblies 660 and 662, respectively, alternately forward and backward along the surface 319 of the bed 321.

The carriage 600 also includes a pair of spaced apart sidewalls 668 and 670, each mounted to one of the side portions 645 and 645', respectively, of the base portion 640, and a ram 661 extending between the sidewalls 668 and 670. The ram 661 is attached to the sidewalls 668 and 670 at a location adjacent to but spaced from the rear portion 643 of the base portion 640. The ram 661 includes a rearwardly facing surface 665 opposite a forwardly facing surface 667. Both of the surfaces 665 and 667 may be substantially perpendicular to the base portion 640; however, this is not a requirement. Like the ram surface 66 of the apparatus 10, the rearwardly facing surface 665 of the ram 661 is adjacent to a front end portion (not shown) of the cargo 90 (see FIG. 1) and configured to press against the front end portion of the cargo 90. One or more supports 673 may be mounted to the forwardly facing surface 667 of the ram 661 and extend between the sidewalls 668 and 670. In the embodiment depicted in the figures, the forwardly facing surface 667 of the ram 661 is not coupled to the rear portion 643 of the base portion 640. One or more spacers or supports 669 may be mounted laterally between the sidewalls 668 and 670.

The carriage 600 includes a pair of longitudinally spaced apart transverse axles 672 and 674 mounted to the base portion 640 between the sidewalls 668 and 670. Along each of the sidewalls 668 and 670, at least one wheel 676 is non-rotatably mounted to each end portion of the axles 672 and 674. The carriage 600 rolls along the bed 321 on the wheels 676, which support the base portion 640 of the carriage above the surface 319 of the bed 321. Each of the wheels 676 is flanked by a pair of bearings 677 and 678 mounted to the base portion 640 and housing a portion of the axle 672 or 674 to which the wheel is coupled. The axles 672 and 674 rotate within the bearings 677 and 678 when the wheels 676 are rotated. In alternate embodiments, the wheels 676 may be rotatably coupled to the axles 672 and 674 by bearing assemblies (not shown). In such embodiments, the axles 672 and 674 are non-rotatably coupled to the base portion 640.

Referring to FIG. 16, one or more scrapers 680 may be coupled to the base portion 640 of the carriage 600. The scrapers 680 may be configured to clear portions of the bed 321 along the path of travel of the wheels 676.

A traveler assembly 700, substantially similar to the traveler assembly 180 of the apparatus 10, is coupled to the base portion 640 and disposed inside the third slot 658. In the apparatus 300, the traveler assembly 700 may prevent the carriage 600 from being pulled sideways by one of the chains 450 and 460 to which the carriage is tethered. Similarly, in the apparatus 10, the traveler assembly 180 may prevent the carriage 65 from being pulled sideways by its drive mechanisms engagement with the chains 150 and 160.

Figure 17:
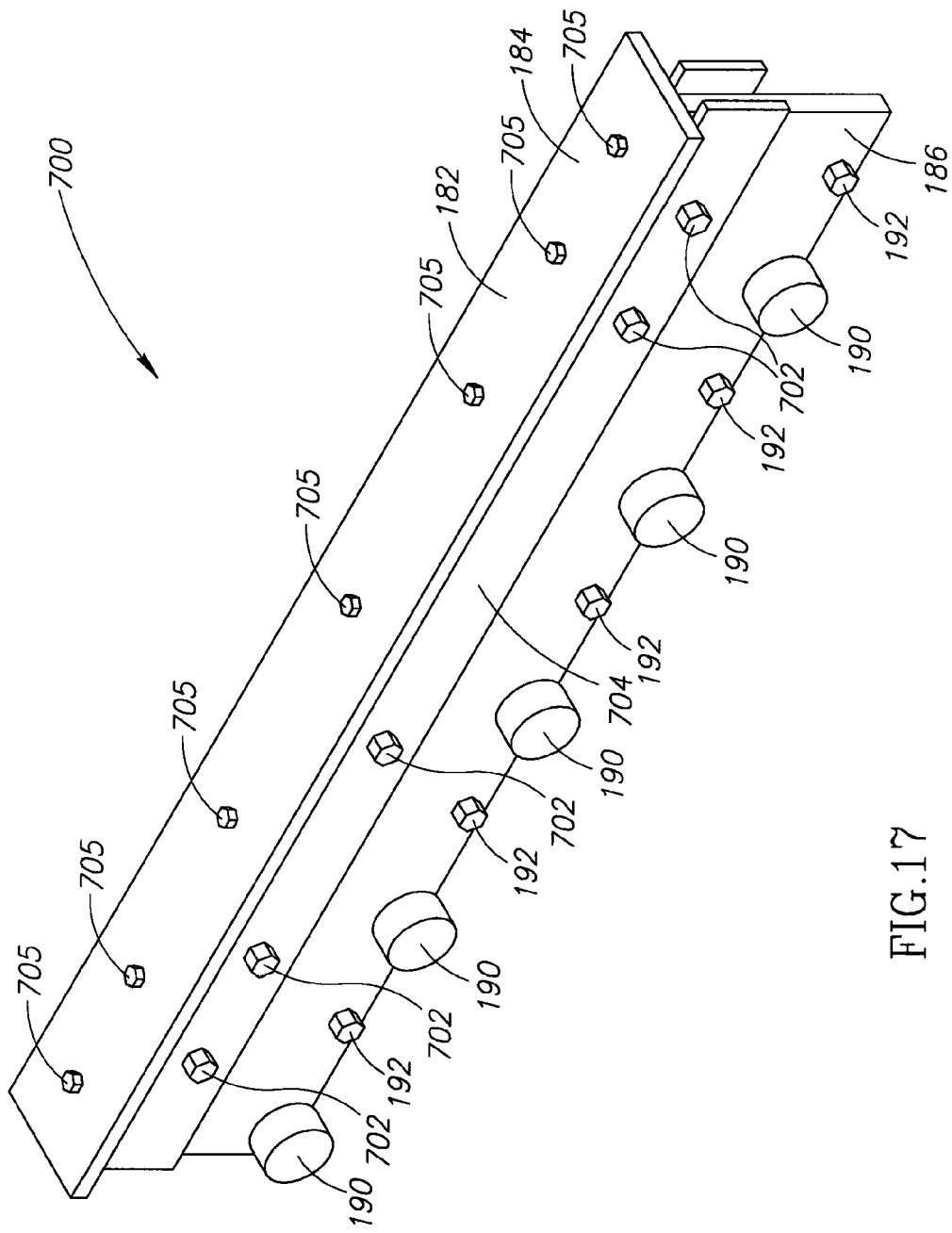
FIG. 17 is a perspective view of the traveler assembly of FIG. 6 as used with the cargo loader apparatus of FIG. 7A.

The traveler assembly 700 extends from the base portion 640 into the center channel 329 through the slot 310 (see FIG. 10) and into the chamber 313. Referring to FIG. 17, additional details related to the traveler assembly 700 will be described. These details are equally applicable to the traveler assembly 180 described above. In FIG. 17, for illustrative purposes, both the carriage 600 and the bed 321 have been omitted. The traveler assembly 700 includes the T-shaped assembly 182 with a horizontal top plate 184 coupled to an upright center plate 186. The top plate 184 rests upon the rails 656 and 657 (see FIG. 16) and the upright center plate 186 extends into the third slot 658 between the rails 656 and 657. The upright center plate 186 is coupled the rails 656 and 657 by fasteners 702, which extend laterally through the rails 656 and 657 and the upright center plate 186 positioned therebetween. An elongated plate 704 may be disposed along each of the rails 656 and 657 and the fasteners 702 may extend through the plates 704 into the rails 656 and 657 and through the center plate 186. The plates 704 may help distribute the forces experienced by the fasteners 702.

Attached to the lower end of the center plate 186 are several sets of support wheels 190 that extend from opposite faces of the center plate 186. Each of the support wheels 190 is coupled to the center plate 186 by a fastener 192. The top plate 184 may be coupled to the upright center plate 186 by one or more adjustable fasteners 705, such as bolt, configured to adjust the distance between the top plate 184 and the upright center plate 186. By adjusting (tightening or loosing) the adjustable fasteners 705, the distance the upright center plate 186 extends into the chamber 313 may be adjusted (tightened or loosened), such that the upright center plate 186 extends far enough into the chamber 313 to space the support wheels 190 an appropriate distance from the lower surfaces 308 and 309 of the flanges 303 and 305 (see FIG. 10) to allow the traveler assembly 700 to move within the center channel 329. For example, the adjustable fasteners 705 may be adjusted such that the support wheels 190 are in contact with the lower surfaces 308 and 309 of the flanges 303 and 305 and roll along the lower surfaces 308 and 309 when the carriage 600 is moving. Alternatively, the support wheels 190 may be positioned at least a predetermined distance from the lower surfaces 308 and 309 of the flanges 303 and 305. When the carriage 600 is moving across the bed 321, the wheels 190 may roll along and press against one or both of the lower surfaces 308 and 309 of the flanges 303 and 305 preventing the carriage from lifting up from the bed 321 while allowing the carriage to move longitudinally along the bed 321. While the traveler assembly 700 has been described as having support wheels 190, those of ordinary skill in the art appreciate that alternate follower elements or members may be used to travel along the lower surfaces 308 and 309 of the flanges 303 and 305, and such embodiments are within the scope of the present teachings.

The apparatus 300 includes the control center 48 (described above), which may optionally include the hydraulic pump 200 and the electric generator 202 mounted at the front section 326 of the trailer 320. The hydraulic pump 200 and the electric generator 202 are connected to and power the trailer's four hydraulic legs 344, 344', 346, and 346' and the motor 510.

Hydraulic lines (not shown) and valves (not shown) connect the hydraulic legs 344, 344', 346, and 346' to the control center 48. Similarly, hydraulic lines (not shown) and valves (not shown) connect the hydraulic vertical supports 53 and 56 to the control center 48.

A sensor (e.g., an automatic limit switch) (not shown) may be coupled to the trailer 320 near its rear end portion 314 and used to determine when the carriage 600 has reach a predetermined rearward stopping point. The sensor may be coupled to the control center 48, which includes an automatic shut-off or other stopping or braking mechanism. When the carriage 600 has been detected to have reached the predetermined rearward stopping point the rearward movement of the carriage 600 along the bed 321 is stopped.

A sensor (e.g., an automatic limit switch) (not shown) may be coupled to the trailer 320 near its front end portion 312 and used to determine when the carriage 600 has reach a predetermined forward stopping point. The sensor may be coupled to the control center 48, which includes an automatic shut-off or other stopping or braking mechanism. When the carriage 600 has been detected to have reached the predetermined forward stopping point the forward movement of the carriage 600 along the bed 321 is stopped. In this manner, the carriage 600 may be prevented from colliding with the drive assembly 500.

The control center 48 includes manual controls allowing an operator to activate the motor 510 and determine the direction of travel of the carriage 600 by determining the direction of rotation of the drive shaft 512 of the motor 510 (see FIG. 11). For example, the controls may include a forward motor control and reverse motor control. The controls may also include a speed control for controlling the speed of the motor 510. Further, the controls may include a motor start, motor stop, and jog control. The control center 48 may also include manually operated controls for lowering and raising the hydraulic legs 344, 344', 346, and 346'. The control center 48 may also include manually operated controls for lowering and raising the hydraulic vertical supports 53 and 56 to the control center 48

The control center 48 may include the scale unit and its display.

As may best be viewed in FIG. 9, one or more stops 790 may be disposed on the bed 321 in the front section 326 and used to limit the forward movement of the carriage 600.

Methods

Figure 18:
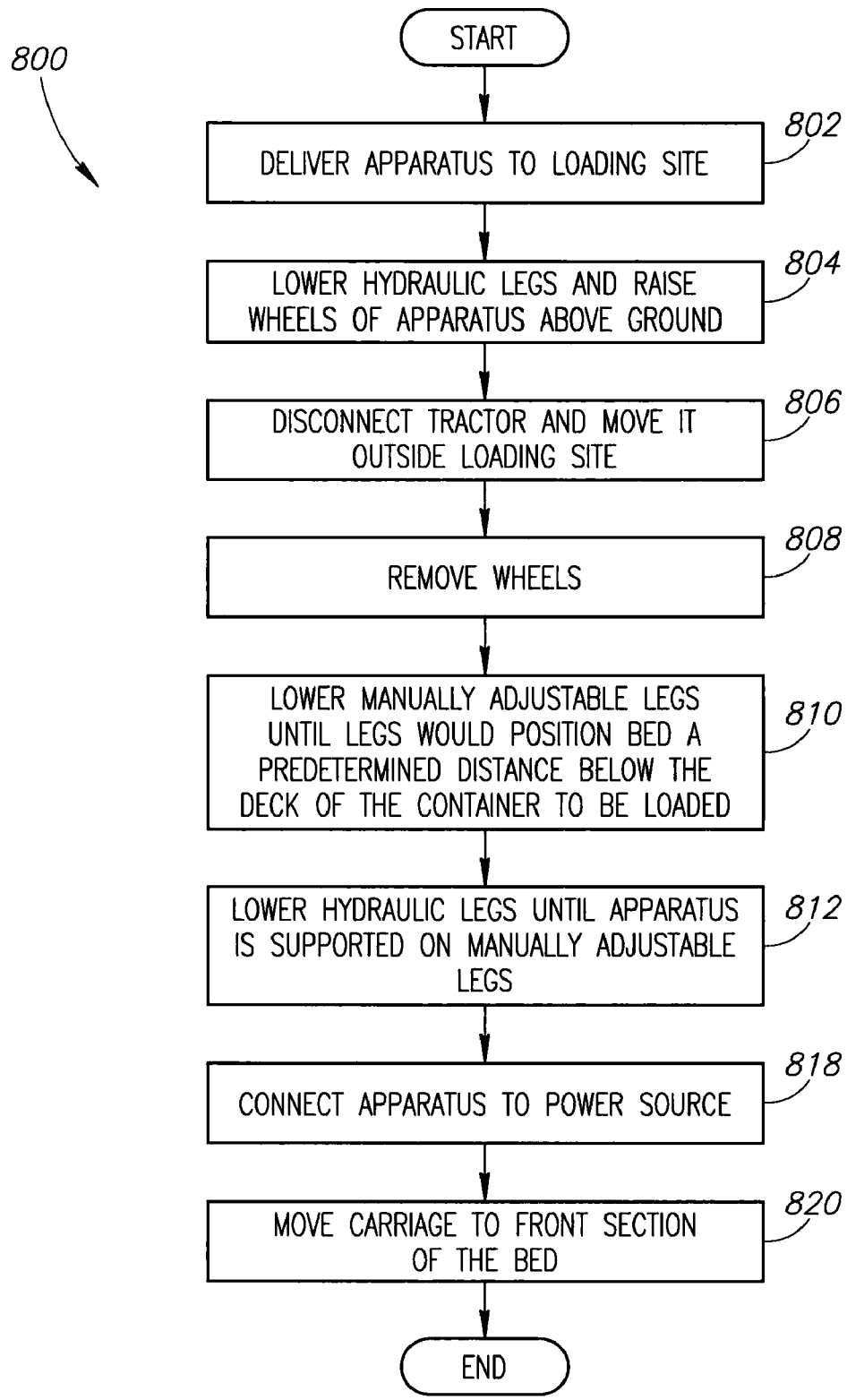
FIG. 18 is a flow diagram of a method of setting up the cargo loader apparatuses of FIGS. 1 and 7A.

FIG. 18, is a flow diagram of a method 800, which may be performed to set up the apparatus 10 and/or apparatus 300 at a loading site. For illustrative purposes only, it will be assumed the method 800 is being performed with respect to the apparatus 300. At block 802, the apparatus 300 is delivered (e.g., pulled by a tractor) to a relatively flat loading site. For example, the apparatus 300 may be positioned on a level concrete, asphalt or compacted base surface. During transport, the carriage 600 may be located in its rearmost position on the bed 321 illustrated in FIG. 7A. During transport, the carriage 600 may be positioned on the bed 321 based on weight distribution. For example, the carriage 600 may be located on the bed 321 at a location that produces the best weight distribution during transport.

As appropriate, blocking may be placed under hydraulic legs 344, 344', 346, and 346' for stability. Then, at block 804, the hydraulic legs 344, 344', 346, and 346' are lowered and the trailer 320 raised sufficiently high to remove the wheels 335 therefrom. In next block 806, the tractor is disconnected from the apparatus 300 and moved away from the area of operation.

In next block 808, the wheels 335 are dismounted from the apparatus 300 and moved away from the area of operation. To remove the wheels 335, dollies may be slid under the wheels. Then, air lines disconnected and wheel locking pins are removed from the wheels 335.

In next block 810, the manually adjustable support legs 338, 338', 340, and 340' may be adjusted to a length that if disposed on the ground would place the bed 321 a predetermined distance (e.g., between approximately 4 inches and approximately 6 inches) lower than the expected height of the load deck of the container 125. Then, at block 812, the length of the hydraulic legs 344, 344', 346, and 346' is shorted such that the apparatus 300 is supported by the manually adjustable support legs 338, 338', 340, and 340'.

In block 818, the apparatus 300 is connected to an electrical power source and the main electrical disconnect is switched into an "ON" position. If necessary, in block 820, from the control station, the operator moves the carriage 600 to the front section of the trailer 320. In other words, the ram 661 is positioned in the retracted cargo loading position illustrated in FIG. 7C. At this point, the method 800 terminates and the apparatus 300 performing the method is ready for use.

Figure 19:
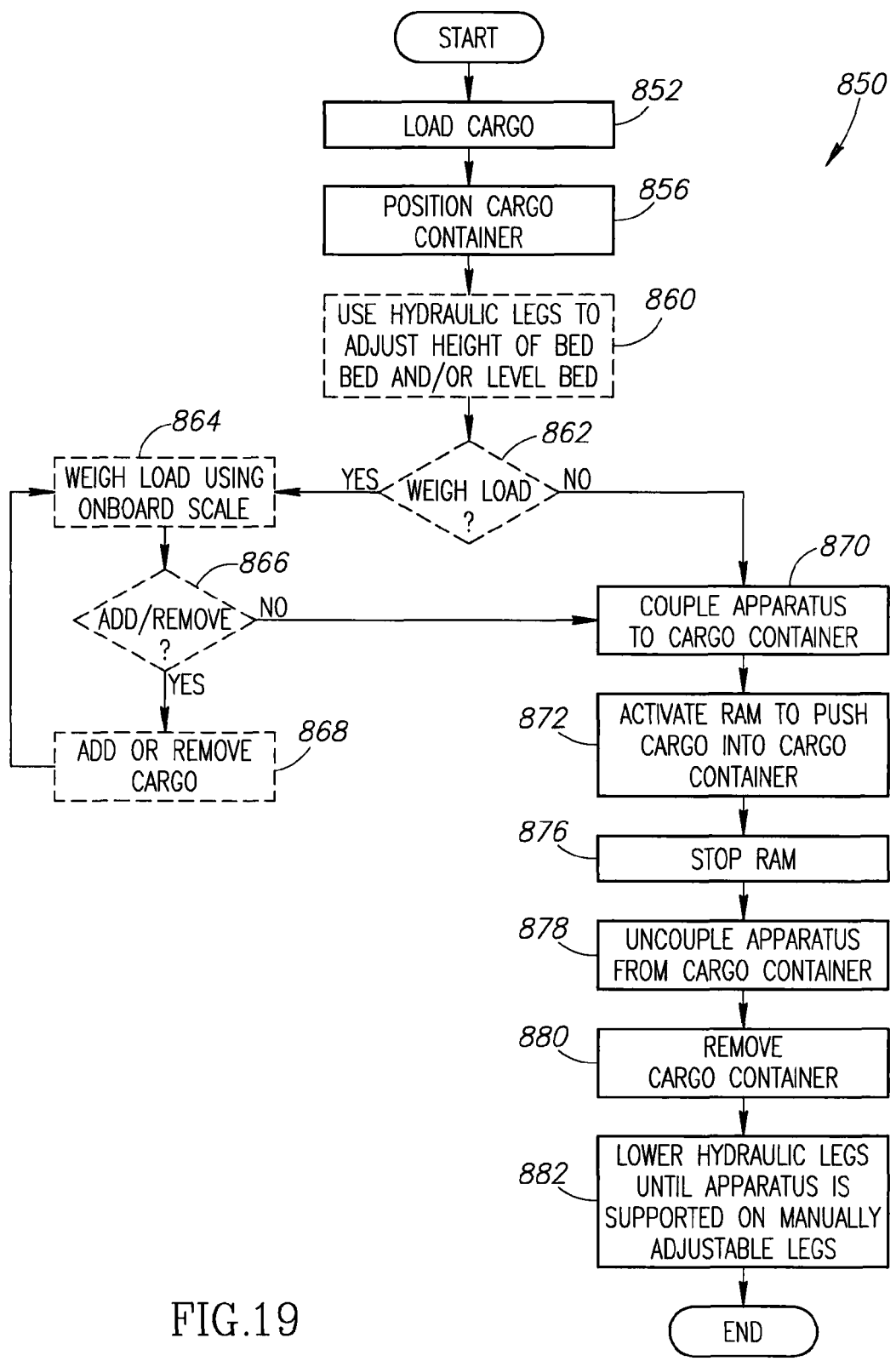
FIG. 19 is a flow diagram of a method performable at least in part by the cargo loader apparatuses of FIGS. 1 and 7A.

FIG. 19, is a flow diagram of a method 850, which may be performed to use the apparatus 10 and/or apparatus 300 at the loading site. For illustrative purposes only, it will be assumed that only the apparatus 300 is performing portions of the method 850. In block 852, the cargo 90 (e.g., a pile of logs) is loaded into the passageway 358 defined between the two discontinuous sidewalls 350 and 355.

In next block 856, the cargo container 125 is positioned relative to the apparatus 300. A container positioning and guidance mechanism may be placed in a container staging area and used to aid the container truck operator in properly aligning the container 125 with the apparatus 300 when backing the container 125 up to the rear end portion 314 of the apparatus 300. Additionally, onsite personnel may monitor and assist the container truck operator back the container 125 up to the rear end portion 314 of the trailer 320. To minimize or avoid damage to the container 125 and/or the apparatus 300, the container should be properly aligned with the apparatus 300.

In next block 860, if necessary, the four hydraulic legs 344, 344', 346, and 346' on the trailer 320 are then used to adjust the height of the bed 321 to be substantially equal to the height of the deck of the cargo container 125. The four hydraulic legs 344, 344', 346, and 346' may also be used to level the bed 321 of the apparatus 300.

Next, in optional decision block 862, a decision is made whether to weight the load using the scale unit. If an auxiliary scale unit was used to pre-state the cargo, use of the scale unit may not be necessary. As discussed above, the cargo 90 may be pre-staged while the apparatus 300 is in use. If the decision in block 862 is "NO," the method 850 advances to block 870, If the decision in block 862 is "YES," in block 864, the onboard scale unit is used to weigh the load. At decision block 866, a decision is made whether to add cargo to or remove cargo from the load. For example, if the load is too heavy because it fails to satisfy container load limits and thus, is illegal, the decision in block 866 is "YES." Similarly, if the load is too under weight, the decision in block 866 is also "YES." In block 868, cargo is added or removed as necessary or desired. After cargo is added to or removed from the load, the method 850 returns to block 864 and the load is weighed again.

If the decision in block 866 is "NO," the method 850 advances to block 870. In block 870, the rear end portion 226 of the container 125 is connected or coupled to the rear end portion 314 of the trailer 320. This connection may help prevent damage to both the container and the apparatus 300 during the loading operation. The trailer 320 may be coupled or bound to the rear portion 126 of the container 125 with binding chains.

In block 872, the operator activates the motor 510 of the rotational drive assembly 500 to move the carriage 600 rearwardly over the bed 321. As the carriage 600 moves rearward, the rearward facing surface 665 of the ram 661 engages the front end portion of the cargo 90 and pushes or otherwise forces the cargo 90 to slide along the bed 321 into the opening 128 and onto the deck of the cargo container 125. The motor 510 may propel the carriage 600 rearward over the bed 321 at a rate of about one (1) foot per second. At this rate, it typically requires about two minutes to push a cargo of approximately 40 foot long logs into the container 125. As the ram 661 is pushing the cargo 90 into the container 125, it may be desirable to monitor the apparatus 300 and container 125 for potential problems.

At block 876, the rearward travel of the ram 661 is halted. In particular embodiments, when the carriage 600 reaches its rearmost position along the bed 321, the automatic limit switch shuts down the motor 510 and stops the carriage 600.

If desired, the motor 510 may be reversed by pressing a reverse button at the control station. It may be desirable to monitor the carriage 600 until the ram 661 is fully retracted to the cargo loading position (depicted in FIG. 7C).

Then, in block 878, the rear portion 126 of the container 125 is disconnected from the rear end portion 314 of the trailer 320. If the trailer 320 was bound to the rear portion 126 of the container 125 with binding chains, the binding chains are disconnected and optionally stored for use with another container.

At this point, in block 880, the cargo container 125 may be removed from the loading site. The operator may instruct the container operator to pull the trailer 130 supporting the container 125 away from the loading site.

After the container has left the loading area, in block 882, the hydraulic legs 344, 344', 346, and 346' may be used to lower the apparatus 300 to rest upon the manually adjustable support legs 338, 338', 340, and 340' in preparation for the next load operation.

Once the cargo container 125 is full of cargo 90, the container 125 may be transported via the trailer 130, the tug, or the railroad car to a final destination or to a cargo container ship. The cargo container 125 filled with the cargo 90 can then be removed from the trailer 130, tug or railroad car and loaded directly onto the cargo ship.

Using the apparatus 10 or the apparatus 300, the cargo container 125 may be loaded with logs more efficiently than is currently available using conventional methods. Further, using the apparatus 10 or the apparatus 300 to load the container 125 may mitigate or eliminate repairs to commercially available log loading equipment that is not currently designed to perform the mechanical movements necessary to load the container. The apparatus 10 and the apparatus 300 may load a container with logs (having a legal weight) in one smooth and efficient operation. Depending upon the particular implementation, it is believed that the time required to load a container may be decreased sufficiently to improve productivity up to three times compared to prior art methods.

The apparatus 10 and the apparatus 300 offer many advantages over prior art methods of loading logs into containers. Depending upon various implementation details, those advantages may include one or more of the following:
1. increased productivity by reducing the time required to load containers;
2. improved safety for personnel during log loading operations;
3. reduced damage to containers and/or loading equipment;
4. reduced loading equipment needs and their associated over head expenses; and
5. reduced fuel cost (because the apparatus 10 and the apparatus 300 are electrically powered).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cargo loading apparatus operable to load cargo into an opening of an enclosed trailer, the apparatus comprising:
   an elongated bed comprising a longitudinally extending center channel comprising an interior portion having a pair of substantially aligned and juxtaposed inwardly longitudinally extending guide members and a gap defined therebetween, each of the guide members having an underside, the bed being divided longitudinally into a rear portion and a front portion, the rear portion of the bed having an open end portion configured to be in a position adjacent to the opening of the enclosed trailer;
   a pair of spaced apart longitudinally extending sidewalls flanking the rear portion of the bed, the sidewalls defining a cargo receiving area on the bed;
   a moveable carriage having a base portion, an upright ram, and a traveler assembly, the base portion being configured to move along the bed between the sidewalls, the upright ram being mounted to the base portion, the traveler assembly being coupled to the base portion and configured to travel inside the center channel of the bed when the carriage moves relative to the bed, the traveler assembly comprising a downwardly extending member and a plurality of wheels, the downwardly extending member being configured to pass between the guide members, and through the gap, the downwardly extending member having a lower portion with a pair of opposing sides, each of the opposite sides being adjacent to one of the guide members of the center channel, the plurality of wheels being mounted to the opposite sides of the lower portion of the downwardly extending member, the wheels being configured to roll along the undersides of the guide members in the center channel, the carriage being positionable on the front portion of the bed to allow cargo to be received in the cargo receiving area on the bed, the carriage being configured to move longitudinally along the bed between the front portion and the open end portion of the rear portion of the bed, the upright ram being configured to push cargo received inside the cargo receiving area toward the open end portion of the rear portion of the bed and into the opening of the enclosed trailer as the carriage moves longitudinally rearward along the bed; and a drive assembly coupled to the moveable carriage operable to selectively move the carriage between the front portion and the open end portion of the rear portion of the bed, the drive assembly comprising a pair of spaced apart chains disposed longitudinally along the bed and tethered to the moveable carriage, the longitudinally extending center channel of the bed being positioned between the pair of spaced apart chains, the drive assembly being operable to drive the pair of spaced apart chains along the bed in the same direction, and when so driven, the pair of spaced apart chains being configured to pull the moveable carriage tethered thereto along the bed, when each of the pair of spaced apart chains is driven by the drive assembly, the traveler assembly being operable to maintain the carriage on the bed and to prevent the carriage from being pulled sideways beyond the center channel by one of the pair of spaced apart chains to which the carriage is tethered.

2. The apparatus of claim 1, further comprising:
a support frame configured to support the bed,
wherein the drive assembly further comprises:
a pair of spaced apart front sprockets mounted to the frame under the front portion of the bed,
a pair of spaced apart rear sprockets mounted to the frame under the rear portion of the bed, each of the pair of spaced apart chains being a continuous loop looped around a corresponding one of the pair of front sprockets and a corresponding one of the pair of rear sprockets, and
a motor mounted to the front portion of the bed operable to the drive the pair of front sprockets, driving the pair of front sprockets causing each of the pair of spaced apart chains to rotate around the one of the pair of front sprockets corresponding to the chain and the one of the pair of rear sprockets corresponding to the chain thereby causing the pair of spaced apart chains to move along the bed in a first direction pulling the moveable carriage tethered thereto along the bed in the first direction.

3. The apparatus of claim 2, wherein the center channel is a through channel,
the drive assembly further comprises a drive shaft rotatably coupled to frame under the bed, the pair of front sprockets being mounted on the drive shaft, and
the motor is coupled to the drive shaft by a drive chain extending from the motor to the drive axle through the through channel in the bed, the drive chain being driven by the motor and when so driven, rotating the drive shaft and the pair of front sprockets mounted thereto.

4. The apparatus of claim 2, wherein the bed further comprises a pair of chain guide channels, each of the pair of chain guide channels being configured to guide a corresponding one of the pair of spaced apart chains longitudinally along the bed when the motor drives the pair of front sprockets.

5. The apparatus of claim 2, further comprising:
a pair of return chain guides, each of the pair of return chain guides being mounted to the frame under the bed and operable to guide a corresponding one of the pair of spaced apart chains between the one of the pair of front sprockets corresponding to the chain and the one of the pair of rear sprockets corresponding to the chain.

6. The apparatus of claim 1, wherein the center channel is a through channel.

7. The apparatus of claim 1, wherein the plurality of wheels are configured to prevent disengagement of the downwardly extending member from the center channel.

8. The apparatus of claim 1 for use by an operator, further comprising:
a scale unit configured to weigh the cargo received in the cargo receiving area of the bed and display the weight to the operator.

9. The apparatus of claim 1, further comprising:
a first pair of extendable support legs coupled to the rear portion of the bed near the open end portion; and
a second pair of extendable support legs coupled to the rear portion of the bed near the front portion of the bed, the first and second pairs of extendable support legs being operable to selectively raise and lower the bed relative to the opening of the enclosed trailer.

10. The apparatus of claim 1, further comprising:
a trailer supporting the bed, the trailer being configured to be pulled behind a truck.

11. The apparatus of claim 1, wherein each of the pair of spaced apart sidewalls is discontinuous and includes an open cargo loading portion through which a cargo handling device may load cargo into the cargo receiving area on the bed.

12. The apparatus of claim 1, wherein each of the pair of spaced apart sidewalls is discontinuous to define a laterally open cargo loading portion configured to allow a claw grasping cargo located in the loading portion to extend laterally beyond the sidewalls when opened to release the cargo without contacting the sidewalls.

13. The apparatus of claim 1, further comprising:
a frame configured to support the bed, each of the pair of spaced apart sidewalls being coupled to the frame by a height adjustable support.

14. The apparatus of claim 13, wherein each of the height adjustable supports comprises an extendable member configured to adjust the height of the sidewall to which it is coupled when extended.

15. The apparatus of claim 1, wherein the drive assembly further comprises a stop switch configured to automatically stop the carriage when the carriage is moving longitudinally along the bed toward the open end portion of the rear portion of the bed and reaches a predetermined stopping location.

16. A cargo loading apparatus operable to load cargo into an opening of an enclosed trailer, the apparatus comprising:
an elongated bed divided into a first portion and a second portion, the first portion of the bed having an open end portion configured to be in position adjacent to the opening of the enclosed trailer, the first portion having a cargo receiving area, a channel extending along the bed comprises an interior portion having a pair of substantially aligned and juxtaposed inwardly, guide members and a gap defined therebetween, each of the guide members having an underside;
a moveable carriage configured to move along the bed in the cargo receiving area, and being positionable on the second portion of the bed to allow cargo to be received in the cargo receiving area, the carriage being configured to move along the bed between the second portion and the open end portion of the first portion of the bed, the carriage having a ram configured to push cargo received inside the cargo receiving area toward the open end portion of the first portion of the bed and into the opening of the enclosed trailer as the carriage moves along the bed in the cargo receiving area;
a drive assembly coupled to the moveable carriage operable to selectively move the carriage between the second portion and the open end portion of the first portion of the bed; and
a traveler assembly coupled to the moveable carriage and configured to travel inside the channel when the carriage moves relative to the bed, the traveler assembly comprising a downwardly extending member and follower members, the downwardly extending member being configured to pass between the guide members, and through the gap, the downwardly extending member having a lower portion with a pair of opposing sides, each of the opposite sides being adjacent to one of the guide members, and the follower members being mounted to the opposite sides of the lower portion of the downwardly extending member, the follower members being configured to engage the undersides of the guide members and prevent disengagement of the downwardly extending member from the channel.

17. The apparatus of claim 16, wherein the drive assembly includes at least one chain disposed along the bed and tethered to the moveable carriage, the drive assembly being operable to the drive the at least one chain along the bed, and when so driven, the at least one chain being configured to pull the moveable carriage tethered thereto along the bed.

18. The apparatus of claim 17, wherein the at least one chain disposed along the bed comprises a pair of spaced apart chains,
the drive assembly is operable to drive the pair of spaced apart chains in the same direction along the bed,
the channel extending along the bed is a center channel positioned between the pair of spaced apart chains, and
when each of the pair of spaced apart chains is driven by the drive assembly, the traveler assembly is operable to maintain the carriage on the bed and to prevent the carriage from being pulled sideways beyond the center channel by one of the pair of spaced apart chains to which the carriage is tethered.

19. The apparatus of claim 16, further comprising:
a support frame configured to support the bed,
at least one chain, and
the drive assembly further comprising:
at least one first sprocket mounted to the frame,
at least one second sprocket mounted to the frame, the at least one chain being a continuous loop looped around the at least one first sprocket and the at least one second sprocket, the at least one chain having a first portion disposed along the bed and tethered to the moveable carriage, and
a drive operable to the drive the at least one first sprocket, driving the at least one first sprocket causing the continuous loop of the at least one chain to rotate around the at least one first sprocket and the at least one second sprocket causing the first portion of the at least one chain to move along the bed in a first direction pulling the moveable carriage tethered thereto along the bed in the first direction.

20. The apparatus of claim 16, further comprising:
at least one chain having a first portion and a second portion the at least one chain being disposed along the bed, the at least one chain being anchored by its first portion to the second portion of the bed, and the at least one chain being anchored by its second portion to the first portion of the bed, and
the drive assembly being mounted to the carriage and engaging the at least one chain, the drive assembly being operable to the drive the carriage along the at least one chain.

21. The apparatus of claim 16, further comprising a pair of spaced apart discontinuous sidewalls flanking the cargo receiving area.

22. The apparatus of claim 21, further comprising:
a frame configured to support the bed, each of the pair of spaced apart discontinuous sidewalls being coupled to the frame by a height adjustable support.

23. The apparatus of claim 16, wherein the drive assembly further comprises a stop switch configured to automatically stop the carriage when the carriage is moving along the bed toward the open end portion of the first portion of the bed and reaches a predetermined stopping location.

24. A cargo loading apparatus operable to load cargo into an opening of an enclosed trailer, the apparatus comprising:
an elongated bed comprising a through channel, the bed being divided longitudinally into a rear portion and a front portion, the rear portion of the bed having an open end portion configured to be in position adjacent to the opening of the enclosed trailer, the through channel extending longitudinally along the bed and comprising an interior portion having a pair of substantially aligned and juxtaposed inwardly, longitudinally extending guide members and a gap defined therebetween, each of the guide members having an underside;
a support frame configured to support the bed;
at least one chain;
a pair of spaced apart longitudinally extending sidewalls flanking the rear portion of the bed, the sidewalls defining a cargo receiving area on the bed;
a moveable carriage having a base portion configured to move along the bed between the sidewalls and an upright ram mounted to the base portion, the carriage being positionable on the front portion of the bed to allow cargo to be received in the cargo receiving area on the bed, the carriage being configured to move longitudinally along the bed between the front portion and the open end portion of the rear portion of the bed, the upright ram being configured to push cargo received inside the cargo receiving area toward the open end portion of the rear portion of the bed and into the opening of the enclosed trailer as the carriage moves longitudinally rearward along the bed;
a traveler assembly coupled to the base portion of the moveable carriage and configured to travel inside the through channel when the carriage moves relative to the bed, the traveler assembly comprising a downwardly extending member and follower members, the downwardly extending member being configured to pass between the guide members, and through the gap, the downwardly extending member having a lower portion with a pair of opposing sides, each of the opposite sides being adjacent to one of the guide members, the follower members being mounted to the opposite sides of the lower portion of the downwardly extending member, the follower members being configured to engage the undersides of the guide members and prevent disengagement of the downwardly extending member from the through channel; and
a drive assembly coupled to the moveable carriage operable to selectively move the carriage between the front portion and the open end portion of the rear portion of the bed, the drive assembly comprising:
at least one front sprocket mounted to the frame under the front portion of the bed,
a drive shaft rotatably coupled to frame under the bed, the at least one front sprocket being mounted on the drive shaft,
at least one rear sprocket mounted to the frame under the rear portion of the bed, the at least one chain being a continuous loop looped around the at least one front sprocket and the at least one rear sprocket, the at least one chain having a first portion disposed longitudinally along the bed and tethered to the moveable carriage, and a motor mounted to the front portion of the bed operable to the drive the at least one front sprocket, the motor being coupled to the drive shaft by a drive chain extending from the motor to the drive axle through the through channel in the bed, the drive chain being driven by the motor and when so driven, rotating the drive shaft and the at least one front sprocket mounted thereto, driving the at least one front sprocket causing the continuous loop of the at least one chain to rotate around the at least one front sprocket and the at least one rear sprocket causing the first portion of the at least one chain to move along the bed in a first direction pulling the moveable carriage tethered thereto along the bed in the first direction.

25. The apparatus of claim 24, wherein the bed further comprises a chain guide channel corresponding to each of the at least one chains, each chain guide channel being configured to guide the first portion of a corresponding one of the at least one chains disposed longitudinally along the bed when the motor drives the at least one front sprocket.

26. The apparatus of claim 24, further comprising:
a return chain guide corresponding to each of the at least one chains, each return chain guide being mounted to the frame under the bed and operable to guide a second portion of a corresponding one of the at least one chains between the at least one front sprocket and the at least one rear sprocket.

27. The apparatus of claim 24 for use by an operator, further comprising:
a scale unit configured to weigh the cargo received in the cargo receiving area of the bed and display the weight to the operator.

28. The apparatus of claim 24, further comprising:
a first pair of extendable support legs coupled to the rear portion of the bed near the open end portion; and
a second pair of extendable support legs coupled to the rear portion of the bed near the front portion of the bed, the first and second pairs of extendable support legs being operable to selectively raise and lower the bed relative to the opening of the enclosed trailer.

29. The apparatus of claim 24, further comprising:
a trailer supporting the bed, the trailer being configured to be pulled behind a truck.

30. The apparatus of claim 24, wherein each of the pair of spaced apart sidewalls is discontinuous and includes an open cargo loading portion through which a cargo handling device may load cargo into the cargo receiving area on the bed.

31. The apparatus of claim 24, wherein each of the pair of spaced apart sidewalls is discontinuous to define a laterally open cargo loading portion configured to allow a claw grasping cargo located in the loading portion to extend laterally beyond the sidewalls when opened to release the cargo without contacting the sidewalls.

32. The apparatus of claim 24, wherein each of the pair of spaced apart sidewalls is coupled to the support frame by a height adjustable support.

33. The apparatus of claim 32, wherein each of the height adjustable supports comprises an extendable member configured to adjust the height of the sidewall to which it is coupled when extended.

34. The apparatus of claim 24, wherein the drive assembly further comprises a stop switch configured to automatically stop the carriage when the carriage is moving longitudinally along the bed toward the open end portion of the rear portion of the bed and reaches a predetermined stopping location.

35. A cargo loading apparatus operable to load cargo into an opening of an enclosed trailer, the apparatus comprising:
an elongated bed comprising a through channel, the bed being divided longitudinally into a rear portion and a front portion, the rear portion of the bed having an open end portion configured to be in position adjacent to the opening of the enclosed trailer, the through channel extending longitudinally along the bed and comprising an interior portion having a pair of substantially aligned and juxtaposed inwardly, longitudinally extending guide members and a gap defined therebetween, each of the guide members having an underside;
a support frame configured to support the bed;
at least one chain;
a pair of spaced apart longitudinally extending sidewalls flanking the rear portion of the bed, the sidewalls defining a cargo receiving area on the bed;
a moveable carriage having a base portion configured to move along the bed between the sidewalls and an upright ram mounted to the base portion, the carriage being positionable on the front portion of the bed to allow cargo to be received in the cargo receiving area on the bed, the carriage being configured to move longitudinally along the bed between the front portion and the open end portion of the rear portion of the bed, the upright ram being configured to push cargo received inside the cargo receiving area toward the open end portion of the rear portion of the bed and into the opening of the enclosed trailer as the carriage moves longitudinally rearward along the bed;
a traveler assembly coupled to the base portion of the moveable carriage and configured to travel inside the through channel when the carriage moves relative to the bed, the traveler assembly comprising a downwardly extending member and a plurality of wheels, the downwardly extending member being configured to pass between the guide members, and through the gap, the downwardly extending member having a lower portion with a pair of opposing sides, each of the opposite sides being adjacent to one of the guide members, the plurality of wheels being mounted to the opposite sides of the lower portion of the downwardly extending member, the plurality of wheels being configured to roll along the undersides of the guide members in the through channel and prevent disengagement of the downwardly extending member from the through channel; and
a drive assembly coupled to the moveable carriage operable to selectively move the carriage between the front portion and the open end portion of the rear portion of the bed, the drive assembly comprising:
at least one front sprocket mounted to the frame under the front portion of the bed,
a drive shaft rotatably coupled to frame under the bed, the at least one front sprocket being mounted on the drive shaft,
at least one rear sprocket mounted to the frame under the rear portion of the bed, the at least one chain being a continuous loop looped around the at least one front sprocket and the at least one rear sprocket, the at least one chain having a first portion disposed longitudinally along the bed and tethered to the moveable carriage, and
a motor mounted to the front portion of the bed operable to the drive the at least one front sprocket, the motor being coupled to the drive shaft by a drive chain extending from the motor to the drive axle through the through channel in the bed, the drive chain being driven by the motor and when so driven, rotating the drive shaft and the at least one front sprocket mounted thereto, driving the at least one front sprocket causing the continuous loop of the at least one chain to rotate around the at least one front sprocket and the at least one rear sprocket causing the first portion of the at least one chain to move along the bed in a first direction pulling the moveable carriage tethered thereto along the bed in the first direction.

36. The apparatus of claim 35, wherein the bed further comprises a chain guide channel corresponding to each of the at least one chains, each chain guide channel being configured to guide the first portion of a corresponding one of the at least one chains disposed longitudinally along the bed when the motor drives the at least one front sprocket.

37. The apparatus of claim 35, further comprising:
a return chain guide corresponding to each of the at least one chains, each return chain guide being mounted to the frame under the bed and operable to guide a second portion of a corresponding one of the at least one chains between the at least one front sprocket and the at least one rear sprocket.

38. The apparatus of claim 35 for use by an operator, further comprising:
a scale unit configured to weigh the cargo received in the cargo receiving area of the bed and display the weight to the operator.

39. The apparatus of claim 35, further comprising:
a first pair of extendable support legs coupled to the rear portion of the bed near the open end portion; and
a second pair of extendable support legs coupled to the rear portion of the bed near the front portion of the bed, the first and second pairs of extendable support legs being operable to selectively raise and lower the bed relative to the opening of the enclosed trailer.

40. The apparatus of claim 35, further comprising:
a trailer supporting the bed, the trailer being configured to be pulled behind a truck.

41. The apparatus of claim 35, wherein each of the pair of spaced apart sidewalls is discontinuous and includes an open cargo loading portion through which a cargo handling device may load cargo into the cargo receiving area on the bed.

42. The apparatus of claim 35, wherein each of the pair of spaced apart sidewalls is discontinuous to define a laterally open cargo loading portion configured to allow a claw grasping cargo located in the loading portion to extend laterally beyond the sidewalls when opened to release the cargo without contacting the sidewalls.

43. The apparatus of claim 35, wherein each of the pair of spaced apart sidewalls is coupled to the support frame by a height adjustable support.

44. The apparatus of claim 43, wherein each of the height adjustable supports comprises an extendable member configured to adjust the height of the sidewall to which it is coupled when extended.

45. The apparatus of claim 35, wherein the drive assembly further comprises a stop switch configured to automatically stop the carriage when the carriage is moving longitudinally along the bed toward the open end portion of the rear portion of the bed and reaches a predetermined stopping location.

* * * * *